(12) United States Patent
Burks et al.

(10) Patent No.: US 11,279,481 B2
(45) Date of Patent: Mar. 22, 2022

(54) SYSTEMS AND METHODS FOR TRACKING, EVALUATING AND DETERMINING A RESPONSE TO EMERGENCY SITUATIONS USING UNMANNED AIRBORNE VEHICLES

(71) Applicant: Phirst Technologies, LLC, Tyler, TX (US)

(72) Inventors: Philip E. Burks, Tyler, TX (US); James Nipp, Tyler, TX (US); Jerry Daniel Claridge, Coeur d'Alene, ID (US); Paul Miller, Tyler, TX (US)

(73) Assignee: PHIRST TECHNOLOGIES, LLC, Tyler, TX (US)

( * ) Notice: Subject to any disclaimer, the term of this patent is extended or adjusted under 35 U.S.C. 154(b) by 454 days.

(21) Appl. No.: 15/978,060

(22) Filed: May 11, 2018

(65) Prior Publication Data

US 2018/0327091 A1 Nov. 15, 2018

Related U.S. Application Data

(60) Provisional application No. 62/505,205, filed on May 12, 2017, provisional application No. 62/613,641, filed on Jan. 4, 2018.

(51) Int. Cl.
*B64C 39/02* (2006.01)
*B64C 25/32* (2006.01)
(Continued)

(52) U.S. Cl.
CPC ............ *B64C 39/024* (2013.01); *B64C 25/32* (2013.01); *B64C 29/0016* (2013.01);
(Continued)

(58) Field of Classification Search
None
See application file for complete search history.

(56) References Cited

U.S. PATENT DOCUMENTS

| 3,083,935 A | 4/1963 | Piasecki |
| 5,407,150 A | 4/1995 | Sadleir |

(Continued)

FOREIGN PATENT DOCUMENTS

| AU | 2016329207 A1 | 4/2018 |
| AU | 2016331221 A1 | 4/2018 |

(Continued)

OTHER PUBLICATIONS

International Search Report and Written Opinion for International Application No. PCT/US2018/032459; dated Sep. 27, 2018; 15 pages.

(Continued)

*Primary Examiner* — Thomas G Black
*Assistant Examiner* — Ana D Thomas
(74) *Attorney, Agent, or Firm* — Perkins Coie LLP

(57) ABSTRACT

Various embodiments of systems, apparatus, and/or methods are described for enhanced responsiveness in responding to an emergency situation using unmanned aerial vehicles (drones). Drones are fully autonomous in that they are operated without human intervention from a pilot, an operator, or other personnel. The disclosed drone utilizes movable access doors to provide the capability of vertically takeoff and landing. The drone also includes an emergency recovery system including a mechanism to deploy a parachute in an event of a failure of the on-board autopilot. Also disclosed herein is a drone port that provides an IR-based docking mechanism for precision landing of the drone, with a very low margin of error. Additionally, the drone port includes pads that provide automatic charge to the drone's batteries by contact-based charging via the drone's landing gear legs.

26 Claims, 12 Drawing Sheets

(51) Int. Cl.
  *B64C 29/00*    (2006.01)
  *B64F 1/00*     (2006.01)
  *H04W 4/90*     (2018.01)
  *H04W 4/44*     (2018.01)
  *H04W 4/021*    (2018.01)
  *B64C 39/10*    (2006.01)
  *H04W 12/03*    (2021.01)

(52) U.S. Cl.
  CPC ...... *B64C 29/0025* (2013.01); *B64C 29/0091* (2013.01); *B64C 39/10* (2013.01); *B64F 1/007* (2013.01); *H04W 4/021* (2013.01); *H04W 4/44* (2018.02); *H04W 4/90* (2018.02); *H04W 12/03* (2021.01); *B64C 2039/105* (2013.01); *B64C 2201/02* (2013.01); *B64C 2201/021* (2013.01); *B64C 2201/042* (2013.01); *B64C 2201/108* (2013.01); *B64C 2201/123* (2013.01); *B64C 2201/145* (2013.01); *B64C 2201/165* (2013.01); *B64C 2201/185* (2013.01); *B64C 2201/201* (2013.01)

(56) References Cited

U.S. PATENT DOCUMENTS

| | | | |
|---|---|---|---|
| 9,307,383 B1 * | 4/2016 | Patrick | H04W 4/90 |
| 9,387,928 B1 | 7/2016 | Gentry et al. | |
| 9,454,889 B2 | 9/2016 | Kerning | |
| 9,646,498 B1 | 5/2017 | Brandt et al. | |
| 9,650,133 B2 | 5/2017 | Fisher et al. | |
| 9,834,306 B2 | 12/2017 | Almasoud | |
| 9,852,599 B1 | 12/2017 | Slavin et al. | |
| 9,857,791 B2 | 1/2018 | Krishnamoorthy et al. | |
| 9,873,524 B2 | 1/2018 | Fisher et al. | |
| 9,880,563 B2 | 1/2018 | Fisher et al. | |
| 9,954,599 B2 | 4/2018 | Dowlatkhah et al. | |
| 9,977,435 B2 | 5/2018 | Fisher et al. | |
| 10,043,398 B2 | 8/2018 | Akselrod et al. | |
| 10,148,343 B2 | 12/2018 | Shaw et al. | |
| 10,332,407 B2 | 6/2019 | Winkle et al. | |
| 10,356,636 B2 | 7/2019 | Guirguis et al. | |
| 10,369,975 B2 | 8/2019 | Wang et al. | |
| 10,370,122 B2 | 8/2019 | Wang et al. | |
| 10,403,153 B2 | 9/2019 | Glaab et al. | |
| 10,420,062 B2 | 9/2019 | Kim et al. | |
| 10,450,091 B2 | 10/2019 | McMillian et al. | |
| 10,467,885 B2 | 11/2019 | Trundle et al. | |
| 10,504,375 B2 | 12/2019 | Thomas | |
| 10,913,546 B2 | 2/2021 | Krauss et al. | |
| 2006/0192045 A1 | 8/2006 | Heath et al. | |
| 2007/0057113 A1 | 3/2007 | Parks | |
| 2007/0246601 A1 | 10/2007 | Layton et al. | |
| 2015/0094883 A1 | 4/2015 | Peeters et al. | |
| 2015/0148988 A1 | 5/2015 | Fleck | |
| 2015/0234454 A1 | 8/2015 | Kurz | |
| 2016/0055883 A1 | 2/2016 | Soil et al. | |
| 2016/0214710 A1 | 7/2016 | Brody et al. | |
| 2016/0364989 A1 | 12/2016 | Speasl et al. | |
| 2016/0381541 A1 | 12/2016 | Akopian et al. | |
| 2017/0021941 A1 | 1/2017 | Fisher et al. | |
| 2017/0021942 A1 | 1/2017 | Fisher et al. | |
| 2017/0050749 A1 | 2/2017 | Pilskalns | |
| 2017/0092138 A1 | 3/2017 | Trundle et al. | |
| 2017/0106986 A1 | 4/2017 | Sweeny et al. | |
| 2017/0144776 A1 | 5/2017 | Fisher et al. | |
| 2017/0208512 A1 | 7/2017 | Aydin et al. | |
| 2017/0225799 A1 | 8/2017 | Selwyn et al. | |
| 2018/0101182 A1 | 4/2018 | Fisher et al. | |
| 2018/0120445 A1 | 5/2018 | Dill | |
| 2018/0148170 A1 | 5/2018 | Stamatovski | |
| 2018/0194491 A1 | 7/2018 | Fisher et al. | |
| 2018/0217589 A1 | 8/2018 | Kim | |
| 2018/0237161 A1 | 8/2018 | Minnick et al. | |
| 2018/0239369 A1 | 8/2018 | Fisher et al. | |
| 2018/0297702 A1 | 10/2018 | Walker et al. | |
| 2018/0321681 A1 | 11/2018 | Tu | |
| 2018/0327091 A1 | 11/2018 | Burks et al. | |
| 2018/0350245 A1 | 12/2018 | Priest | |
| 2019/0081767 A1 | 3/2019 | Luo et al. | |
| 2019/0138001 A1 | 5/2019 | Matuszeski et al. | |
| 2019/0156685 A1 | 5/2019 | Winkle et al. | |
| 2019/0199534 A1 | 6/2019 | Beaman et al. | |
| 2019/0202578 A1 | 7/2019 | Fox et al. | |
| 2019/0215214 A1 | 7/2019 | Kim et al. | |
| 2019/0243004 A1 | 8/2019 | Dill et al. | |
| 2019/0259280 A1 | 8/2019 | Lamkin et al. | |
| 2019/0327712 A1 | 10/2019 | Moradi et al. | |
| 2019/0329740 A1 | 10/2019 | Wang et al. | |
| 2019/0332974 A1 | 10/2019 | Karatekeli et al. | |
| 2019/0347924 A1 | 11/2019 | Trundle et al. | |
| 2019/0360783 A1 | 11/2019 | Whittaker | |
| 2020/0165008 A1 | 5/2020 | Krauss et al. | |

FOREIGN PATENT DOCUMENTS

| | | |
|---|---|---|
| AU | 2018208596 A1 | 7/2019 |
| CA | 3000005 A1 | 4/2017 |
| CA | 3000035 A1 | 4/2017 |
| CA | 3049726 A1 | 7/2018 |
| CA | 3049798 A1 | 7/2018 |
| CN | 204250382 U | 4/2015 |
| CN | 204881630 U | 12/2015 |
| CN | 205066582 U | 3/2016 |
| CN | 205273882 U | 6/2016 |
| CN | 105833542 A | 8/2016 |
| CN | 105913129 A | 8/2016 |
| CN | 105947228 A | 9/2016 |
| CN | 106081146 A | 11/2016 |
| CN | 205916345 U | 2/2017 |
| CN | 103285599 A | 3/2017 |
| CN | 105518488 A | 3/2017 |
| CN | 106482713 A | 3/2017 |
| CN | 106688272 A | 5/2017 |
| CN | 106712265 A | 5/2017 |
| CN | 106887161 A | 6/2017 |
| CN | 206258112 U | 6/2017 |
| CN | 106986043 A | 7/2017 |
| CN | 107016419 A | 8/2017 |
| CN | 107289945 A | 10/2017 |
| CN | 107291100 A | 10/2017 |
| CN | 107357309 A | 11/2017 |
| CN | 107390715 A | 11/2017 |
| CN | 107402579 A | 11/2017 |
| CN | 105947146 A | 1/2018 |
| CN | 107635239 A | 1/2018 |
| CN | 206863541 U | 1/2018 |
| CN | 207007014 U | 2/2018 |
| CN | 107745823 A | 3/2018 |
| CN | 107826262 A | 3/2018 |
| CN | 106132827 A | 4/2018 |
| CN | 107912331 A | 4/2018 |
| CN | 207274515 U | 4/2018 |
| CN | 108093389 A | 5/2018 |
| CN | 108094354 A | 6/2018 |
| CN | 108137153 A | 6/2018 |
| CN | 108146639 A | 6/2018 |
| CN | 108248865 A | 7/2018 |
| CN | 108248884 A | 7/2018 |
| CN | 207625811 U | 7/2018 |
| CN | 207748040 U | 8/2018 |
| CN | 207752341 U | 8/2018 |
| CN | 207754346 U | 8/2018 |
| CN | 108702638 A | 10/2018 |
| CN | 108885461 A | 11/2018 |
| CN | 108886428 A | 11/2018 |
| CN | 208102371 U | 11/2018 |
| CN | 109153458 A | 1/2019 |
| CN | 105739300 A | 2/2019 |
| CN | 109314868 A | 2/2019 |
| CN | 109890703 A | 6/2019 |
| CN | 108516069 A | 7/2019 |
| CN | 109956029 A | 7/2019 |
| CN | 106504587 A | 9/2019 |

(56) References Cited

FOREIGN PATENT DOCUMENTS

| | | | |
|---|---|---|---|
| CN | 106792716 A | 12/2019 |
| DE | 202016106887 U1 | 3/2018 |
| DE | 102017000783 A1 | 7/2018 |
| DK | 3120597 T3 | 11/2018 |
| EP | 2978258 A1 | 3/2017 |
| EP | 3222530 A1 | 9/2017 |
| EP | 2938117 A1 | 12/2017 |
| EP | 3157811 A | 8/2018 |
| EP | 3356857 A | 8/2018 |
| EP | 3357040 A | 8/2018 |
| EP | 3412568 A1 | 12/2018 |
| EP | 3268277 A | 7/2019 |
| EP | 3552191 A | 10/2019 |
| EP | 3568842 A | 11/2019 |
| EP | 3575896 A1 | 12/2019 |
| EP | 3577529 A | 12/2019 |
| JP | 2017069803 A | 4/2017 |
| JP | 2018112029 A | 7/2018 |
| JP | 6375570 B2 | 8/2018 |
| JP | 2018165115 A | 10/2018 |
| JP | 2019006238 A | 1/2019 |
| JP | 6475898 B1 | 2/2019 |
| JP | 2019023020 A | 2/2019 |
| JP | 2019027122 A | 2/2019 |
| JP | 6522106 B2 | 5/2019 |
| JP | WO2017199940 A1 | 5/2019 |
| JP | 6534450 B2 | 6/2019 |
| JP | 2019089461 A1 | 6/2019 |
| JP | 2019175483 A | 10/2019 |
| KR | 100842104 B1 | 6/2008 |
| KR | 101700395 B1 | 2/2017 |
| KR | 101707916 B1 | 2/2017 |
| KR | 20170014609 A | 2/2017 |
| KR | 20170030442 A | 3/2017 |
| KR | 20170080354 A | 7/2017 |
| KR | 20170119085 A | 10/2017 |
| KR | 101800767 B1 | 11/2017 |
| KR | 101857566 B1 | 5/2018 |
| KR | 20180066997 A | 6/2018 |
| KR | 101891934 B1 | 8/2018 |
| KR | 101944354 B1 | 1/2019 |
| KR | 101951556 B1 | 2/2019 |
| KR | 101946429 B1 | 5/2019 |
| KR | 20190056926 A | 5/2019 |
| KR | 20190001844 U | 7/2019 |
| KR | 102007955 B1 | 8/2019 |
| KR | 101999126 B1 | 9/2019 |
| KR | 102022695 B1 | 9/2019 |
| KR | 102039797 B1 | 11/2019 |
| KR | 102053374 B1 | 12/2019 |
| RU | 2634470 C2 | 10/2017 |
| RU | 183107 U1 | 9/2018 |
| SG | 152107 A1 | 5/2009 |
| TW | I626191 A | 6/2018 |
| WO | WO2015196081 A1 | 12/2015 |
| WO | WO2016029169 A1 | 2/2016 |
| WO | 2016196093 | 12/2016 |
| WO | WO2018122821 A2 | 7/2018 |
| WO | WO2019025919 A1 | 2/2019 |
| WO | WO2019034086 A1 | 2/2019 |
| WO | WO2019041095 A1 | 3/2019 |
| WO | WO2019061533 A1 | 4/2019 |
| WO | WO2019067277 A1 | 4/2019 |
| WO | WO2019079927 A1 | 5/2019 |
| WO | WO2019079959 A1 | 5/2019 |
| WO | WO2019080053 A1 | 5/2019 |
| WO | WO2019084811 A1 | 5/2019 |
| WO | WO2019084871 A1 | 5/2019 |
| WO | WO2019084872 A1 | 5/2019 |
| WO | WO2019085152 A1 | 5/2019 |
| WO | WO2019090724 A1 | 5/2019 |
| WO | WO2019129085 A1 | 7/2019 |
| WO | WO2019135271 A1 | 7/2019 |
| WO | WO2019168043 A1 | 9/2019 |
| WO | WO2019169880 A1 | 9/2019 |
| WO | WO2019184586 A1 | 10/2019 |
| WO | WO2019203884 A1 | 10/2019 |
| WO | WO2019204823 A1 | 10/2019 |

OTHER PUBLICATIONS

India Patent Application No. IN201611019351, filed Dec. 8, 2017; Inventors: Bhardwaji, N. and Bardwaji, B.; 16 pages.

India Patent Application No. IN201741030466, filed Jan. 25, 2019; Inventors: Veltech Dr Rr & Dr Sr University; 19 pages.

Ai/Robotics website, accessed Mar. 2, 2021, at http://www.airobotics.com/; 3 pages.

Azur Drones website, accessed Mar. 2, 2021, at http://www.azurdrones.com/; 4 pages.

Easy Aerial Inc. website accessed Mar. 2, 2021, from https://easyaerial.com/, 17 pages.

Nightingale Security Brochure dated Aug. 29, 2020, accessed Mar. 2, 2021, from https://www.nightingalesecurity.com/; 16 pages.

\* cited by examiner

SYSTEMS AND METHODS FOR TRACKING, EVALUATING AND DETERMINING A RESPONSE TO EMERGENCY SITUATIONS USING UNMANNED AIRBORNE VEHICLES

CROSS-REFERENCE TO RELATED APPLICATIONS

The present application claims the benefit of U.S. patent applications 62/505,205 filed May 12, 2017 and 62/613,641 filed Jan. 4, 2018, the disclosures of which are hereby incorporated by reference in their entireties.

FIELD OF THE DISCLOSURE

The present disclosure generally relates to systems and methods that provide efficient situational awareness of emergency situations, and more particularly to the use of airborne vehicles that aid in providing optimized response to emergency situations.

BACKGROUND

In typical emergency response situations, dispatchers at emergency call centers (also referred to as computer-aided dispatch centers) receive a call related to the emergency and thereafter respond to the emergency by dispatching response units (generally termed as first responders) to the location of the emergency. However, the call related to the emergency often provides very little information about the emergency. As a result, the dispatcher's knowledge of the emergency is limited to the "description" of the emergency provided in the call. Thus, there exists a need for a new perspective that can help in determining how to use resources effectively in responding to emergency situations.

DETAILED DESCRIPTION

Figure 1A:
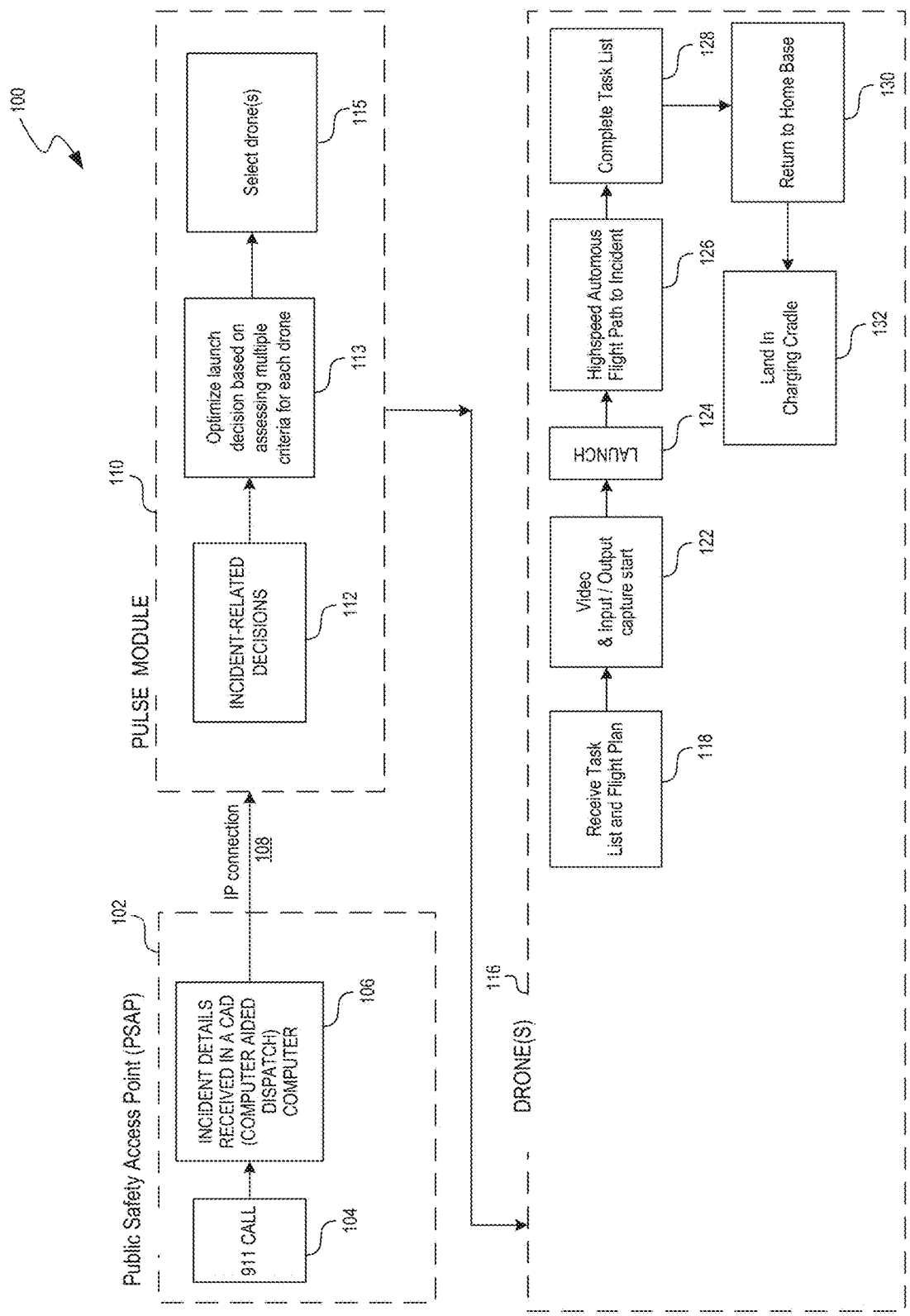
FIG. 1A illustrates steps/functionalities and associated actors in providing optimized response to emergency situations, according to an embodiment.

Embodiments of the present disclosure provide methods, systems, and apparatuses for effectively responding to emergency situations using drones (also referred to herein as unmanned airborne vehicles (UAVs) or unmanned aircraft systems (UASs)). Non-limiting examples of emergency situations can include fires, accidents, riots, gunshots, missing persons, post-storm operations, earthquakes, floods, landslides, gas leaks, chemical leaks, etc., collectively referred to herein as "incidents." For example, drones can be deployed to relay aerial images and video of an incident, thereby providing "eyes on the ground" which can allow emergency dispatchers with information about how to handle the emergency and what resources are necessary to get the incident under control. That is, among others, one benefit of deploying drones in emergency situations is for providing enhanced situational awareness of an emergency incident. Drones can thus complement the amount of information received about the scene of the incident (e.g., from bystanders and/or other sources) in providing a faster response time to react to an emergency, thereby cutting emergency response costs, and most importantly, saving lives and property. In some situations, drones can be used as a substitute in place of emergency unit personnel. For example, in a potentially hazardous scene, drones can be initially deployed to assess the hazard before dispatchers so that dispatchers can understand what they're dealing with. Thus, embodiments of the disclosed technology can be utilized to proactively respond to an emergency, i.e., prior to dispatchers arriving at the emergency. Because a delay of even a few seconds can result in loss of human lives and millions of dollars in damage, the technology described herein offers significant advantages for saving lives and property over traditional practices of deploying drones reactively, i.e., subsequent to emergency personnel arriving at an emergency.

In some embodiments, a swarm of drones can monitor an affected area as fast as possible looking for survivors or victims, e.g., affected by an earthquake or affected by a gas/chemical leak. In such scenarios, a swarm of drones can co-operatively work together to cover a geographical terrain and collectively relay the information collected by them to remote dispatchers. In some scenarios, a swarm of drones can be programmed into a bird-like formation cutting through the sky and scanning the ground with multiple cameras. In other scenarios, a smaller number of drones can take individual paths to work together to scan an area grid. For example, a swarm of drones can "share" a common map of a terrain, communicating to each other the position already monitored, and choose (in real-time or near real-time) the next position to be visited.

A drone can be identified by an IP address of a network interface card (NIC) coupled to the drone. This allows drones to communicate with dispatchers in ground stations and/or with each other using PS-LTE, cellular LTE, cellular 3G, or any suitable wireless protocol. The disclosed technology is also operable when one or more of the above-mentioned protocols are combined into another broadband network, such as the First Responder Network Authority ("FirstNet") broadband network.

In some example implementations, a drone can hover (e.g., remain in stationary flight) at the location of the incident or loiter in a circular, rectangular, or an otherwise suitable flight pattern until emergency personnel arrive. While loitering circularly, a camera fitted to the drone can be pointed towards one or multiple points of interest at the location of the incident. When a drone is provided with latitude/longitude or geographical coordinates corresponding to the location of the incident, the drone calculates a "geofence," e.g., hovering or loitering within a certain geographical area with respect to the given latitude/longitude. The geofenced flight area can be calculated by the drone autonomously, based on an available battery life, a power required to fly at maximum speeds in a horizontal manner (e.g., fly along a horizontal vector) to the location of the incident, a power required to hover or loiter above the location of the incident, a power required to fly back to the drone's home base, a power required to dock into a docking station at the drone's home base, and other relevant parameters. In some implementations, the home base of a drone can be a mobile platform such as a mobile command center (e.g., a moving vehicle) typically installed in disaster-recovery sites. The term "location" can relate to (but not limited to) a point specified by latitude/longitude, a bounded region surrounding a point, an annulus in between two regions, a location specified in three-dimensional (3D) coordinates, a building, a park, or any other physical location.

According to disclosed embodiments, a drone or a swarm of drones can be deployed in any type of terrain and can function to take off and land vertically, i.e., the drones can function as a vertical takeoff and landing (VTOL) aerial vehicle. In some embodiments, the drones can be deployed from a home base/facility (e.g., a fire station or a hospital), fly horizontally to the scene of the incident, and eventually fly back to the home base. Because of the VTOL capabilities, drones can be deployed within a short time. In some embodiments, drones are fully autonomous in that they are operated without human intervention from a pilot, an operator, or other personnel. Even the flight plans of drones are developed in an autonomous manner. For example, an on-board autopilot is capable of flying a drone, including takeoff and landing. Further, according to disclosed embodiments, the flight plan is an obstacle-avoidance path so that the drone can fly to the scene of the incident with zero or minimal avoidance, e.g., arising due to trees, buildings, birds, aircrafts or other drones. In some embodiments, drones operate on the X2 platform, developed by xCraft Enterprises, Inc. Additional details related to VTOL drones is disclosed in U.S. application Ser. No. 14/554,892, titled "High speed multi-rotor vertical takeoff and landing aircraft," filed Nov. 26, 2014 and incorporated herein by reference in its entirety. In alternate embodiments, drones can operate on any type of platform, and are not necessarily limited for operation on the X2 platform.

In some embodiments, drones can be equipped with thermal sensors to monitor humans (e.g., victims affected by a natural disaster such as a landslide, a flood, or an earthquake) in lieu of or, in combination, with aerial images and video of the incident. The aerial images and video can be captured by a 4 k optical camera (with optional zoom capability) and pan/tilt/stabilization that is fixed to the body of a drone. In some embodiments, the aerial images and video can be a heat map of a geographical terrain, generated using infra-red technology. In some embodiments, the drone can simultaneously provide a heat map of the terrain and optical images/video of the incident. In some embodiments, a drone can provide assistance to a person who is lost (e.g., in the woods, on a trek, on a hike, or in a trail.) The person can have a mobile application program running on his or her mobile device that notifies a first responder that the person is missing and a geographical area surrounding the missing person. A drone can be deployed to the area. The camera on the drone can detect (or "see") the flash pattern/rate on the person's mobile device and hover close to the person. Thus, embodiments of the disclosed technology allow missing persons to be easily and quickly located. It will be understood that the term "first responder" as used herein has broader applicability in that it covers any type of personnel responding to an emergency situation, including but not limited to second and third responders.

A drone can also include an audio transmitter for emitting sirens/voice announcements at the location of the incident. The sirens/voice announcements can be pre-programmed into the drone prior to arriving at the location of the incident or they can be emitted by the on-board autopilot, i.e., without manual pre-programming. In some embodiments, a drone can be fitted with environmental sensors to collect ambient information about the environment associated with the incident, e.g., temperature, weather, wind speed/direction, humidity, dew point, and the like. In some embodiments, sensors attached to drones can be used to detect or "sniff" gas, chemicals, or radioactive substances in the environment associated with the incident or otherwise surrounding the drone. By hovering at one location or loitering in a certain area along a path and continuously "sniffing" the environment surrounding the drone, the drone can collect data sufficient to create a three-dimensional (3D) map to visually display a profile of temperature, density, concentration, or any other quantifiable metric of a gas or chemical.

In some embodiments, a drone can identify specific objects based on detectable or sensed attributes of the object such as the hottest part of a fire, a yellow box trapped inside debris, a white vehicle at an incident, a specific type of smell, presence of a particular chemical, etc. The list of detectable or sensed attributes of the object can be pre-programmed into the drone or can be transmitted to the drone on-the-fly dynamically. In some embodiments, a drone can be fitted with audio sensors to detect sirens or voices on the ground, at or in close proximity to the location of the incident. For example, a drone can include a directional microphone to mask propeller or other drone-generated noise, but still have the ability to "listen" (e.g., a cry for help or painful moans from a trapped individual) to audio on the ground. In some embodiments, a drone can include a LED spotlight to illuminate the scene of the incident or to indicate that the drone is landing, taking off, or in flight. In some embodiments, a drone is equipped with suitable landing aids to enable precision (e.g., with a tolerance of 2.5 cm) landing at a dock. In some embodiments, the landing accuracy can be enhanced by using laser-based technologies. In some embodiments, a drone can include a modular housing. The modular housing allows different components (e.g., motors, radars, props, flight computers, etc.) of the drones to be fitted/replaced easily and in less time.

In some embodiments, visual and/or thermal information relayed by drones can be integrated with an existing web-based or online mapping application, such as Google Earth, Waze, or other similar mapping applications. The mapping application can display information provided by drones to emergency personnel. In some embodiments, information provided by drones can be provided to dispatchers housed in a facility, such as a fire station, an emergency call center, or a mobile command center at the incident location.

In some embodiments, the drones can be used in conjunction with technology that provides for live tracking and evaluation of an emergency unit responding to a call. For example, in some embodiments, drones can be integrated with one or more functionalities of the Genesis Pulse® modules such as the "Pulse Live," module, the "Pulse Reporting" module, or the "Pulse Replay" module. The "Pulse Live" module provides a real-time mechanism to evaluate, monitor and track calls pertaining to emergency situations as they are processed and responded. The "Pulse Reporting" module includes various tools for a user to evaluate performance of units responding to calls and/or dispatchers sending out units to respond to calls. The "Pulse Replay" module provides the ability to select a call that has already occurred, replay the call in real-time as it would have been depicted in the "Pulse Live" module and compare that call to other activity that was going on in a geographical location or within a response zone during the same time frame. Thus, the replay module is able to replay information indicative of attributes associated with deployment of one or more emergency response vehicles and drones. For example, a user may wish to review and analyze a call where the responding unit was late in order to determine whether the unit was late due to the timeliness of receiving the call from the dispatcher or because of some other issue, such as the unit taking a less than optimal route to respond to the call or the most appropriate unit was assigned to respond to the call. In some embodiments, one or more Pulse modules can take or offer corrective/remedial action in connection with the emergency situation, based on information collected by a drone or based on information from other servers (including but not limited to other Pulse servers). Additional details of the above-mentioned modules are disclosed in U.S. patent application Ser. No. 15/198,186, which is a continuation of U.S. Pat. No. 9,646,498, titled "SYSTEMS AND METHODS FOR LIVE AND REPLAY UTILIZATION AND TRACKING OF VEHICULAR MOVEMENT AND RESPONSE" issued May 9, 2017. Both the above-mentioned patent applications are incorporated herein by reference in their entireties.

In some embodiments, one or more of the above-mentioned modules can wirelessly determine information pertaining to a drone in flight. These modules can be implemented by physical or cloud-based servers. Examples of information pertaining to a drone in flight can be: telematics information such as a real-time location of a drone, remaining battery life of a drone, operational parameters of the drone such as internal heat produced, amount of memory available, amount of processing power consumed, strength of RF signal received at the drone, speed and direction of wind surrounding the drone, temperature surrounding the drone, GPS connectivity, communication network connectivity, indication of any failing mechanical or electrical components etc. Thus, information related to "health" and "welfare" of a drone can be determined. Such information can be used to select which in-flight drone(s) to task for deployment. For example, drones that have sufficient battery life and in close proximity to an emergency situation can be rerouted in flight for deployment to the emergency situation. In some implementations, based on the "health" and "welfare" information collected from a first drone, the disclosed system can determine that the first drone needs to return to its home base, and accordingly, the system can select a second drone to take the place of the first drone. The second drone can either fly from a home base or can be a drone that is already in flight. According to disclosed embodiments, a drone can be re-routed in-flight for deployment to a new incident. In some embodiments, information pertaining to a drone can be displayed on a graphical user interface of a computer at the drone's home base.

FIG. 1A illustrates steps/functionalities and associated actors in providing optimized response to emergency situations, according to an embodiment. A 911 call 104 is received at a Public Safety Access Point (PSAP) 102. Details 106 of the incident such as a type of an incident (fire, medical, police, forest rangers, etc.), a location of the incident, etc. are extracted from the call. In some embodiments, a priority is assigned to the incident. For example, a fire incident can be regarded as a higher priority than a person suffering from a heart attack incident. Details 106 of the incident are received (or, entered) at a computer aided dispatch (CAD) computer associated with PSAP 102. In some embodiments, a remotely-located hosted server called the pulse module 110 communicates (e.g., via IP connection 108) with the CAD computer associated with PSAP 102 to retrieve details of the incident to make incident-related decisions 112.

Because drones can be distributed at different geographical locations and have varying "health," there can be several choices in determining which drone or drones to deploy. In selecting which drone(s) to deploy, pulse module 110 can optimize over multiple criteria 113 associated with launching, landing, and in-flight operations of a collection of drones. Non-limiting examples of such criteria can be a distance between the drone's present location and the incident location, a weather at the incident location, a weather at the launch location, an amount of battery power in the drone, crowd-sourced information from external information sources such as WAZE®, obstacles in the drone's flight path, or otherwise any suitable criteria associated with the "health" and "welfare" of the drone. Based on the outcome of the launch decision, one or more strategically placed and "healthy" drones are selected 115 for deployment. For example, the selected drones could be docked at a facility. In some applications, one or more drones that are already in the air, can be re-deployed. For example, if a drone's task at a first incident has been completed, then the drone can be re-routed to address a second incident, before returning to home base.

After one or more drones are selected, a task list and flight plan 118 is loaded onto the drone. The task list can include various actions that the drone is supposed to carry out at the incident location, e.g., hover/circle/illuminate the location of the incident, mission close-out details, etc. The flight path can be an obstacle-avoidance path taken by the drone and the parameters (height, distance, speed, direction, acceleration, bearing, estimated time of flight, estimated time of hover, estimated time to fly back to base, etc.) of the flight path.

Upon receiving the authorization to launch, the drone may begin capturing data 122. The term "data" as used herein is broadly applicable to any types of data that can be sensed, captured, or extracted using any analog, digital, or hybrid methodology. Non-limiting examples of such data can be audio, images, video, weather data, "sniffer" data for gas/chemicals/biological/radioactive substances, control/telemetry data relating to the drone's electrical/mechanical functions, operational parameters, etc. Then, the drone is launched 124. It will be appreciated that embodiments of the disclosed technology facilitate faster deployment of drones to the location of an incident, thereby saving lives and damage to properties.

In some embodiments, based on a computer-generated autonomous flight path 126, the drone is configured to at high speed (e.g., one mile per minute) and a low altitude (e.g., 300 feet above the ground) to the location of the incident. Real-time video and audio maybe transmitted upon arriving at the location of the incident and (optionally) during transit. In some applications, a drone can provide different resolutions/qualities of the captured data. In some applications, the captured data can include a timestamp for subsequent review/analysis of details related to the incident or the performance of emergency units responding to the incident. At the location of the incident, the drone completes a task list 128 that was assigned to the drone previously, transmitted in real time, or autonomously generated by the drone's on-board "autopilot" computer. Finally, the drone returns to its home 130, based on a "return to home" flight path, and lands in its charging cradle 132 (also referred to as a "drone port") for getting charged for a subsequent mission.

In some applications, the streamed data can be used to monitor a drone in the air. In some applications, the streamed data can be archived for future analysis of the effectiveness of the deployed drone. The streamed data can be saved on a cloud storage server in real-time, periodically, or intermittently. In some use cases, in lieu of, or in combination with live streaming, the data captured by the drone can be saved locally, e.g., on a SD card or a hard drive. Locally stored data can be uploaded to a storage (physical or cloud) server at the drone's home base and then deleted from the drone's local storage, as and when necessary.

In some scenarios, instead of deploying a single drone, a swarm of drones can be selected for deployment. For example, a swarm of mission-ready drones can be launched from the same home base or geographically-distributed home bases. The drones can be deployed in near-instantaneous time or at different times, depending on the availability of the drones and/or the severity of the incident.

In some applications, a drone operator can take-over/over-ride the drone's operations, if necessary. For example, an operator/commander of the drone can decide whether or not to launch the drone, over-ride an automated launch of a drone, decide whether a mission is to be discontinued after launch, or modify a drone's automatically-generated flight path with alternate values of destination, speed, direction of travel, acceleration, etc. Further, in some applications, different drone operators can be provided different levels of access to the drone's flight path, based on the role/responsibilities of the drone operator. For example, an "admin" drone operator can view and edit a drone's flight path in contrast to a non-admin drone operator may only be able to view but not edit the drone's flight path. In some instances, a drone operator can control 20-30 deployed drones on their respective missions while assuring compliance of the Federal Aviation Administration (FAA), or generally compliance of a jurisdiction. In alternate embodiments, there is no limitation on the number of drones that an operator can control. Before the drone is launched, the operator can review different launch launch/takeoff criteria of the drone such as battery health, WiFi connectivity, GPS, compass, weather details and other suitable criteria.

Figure 1B:
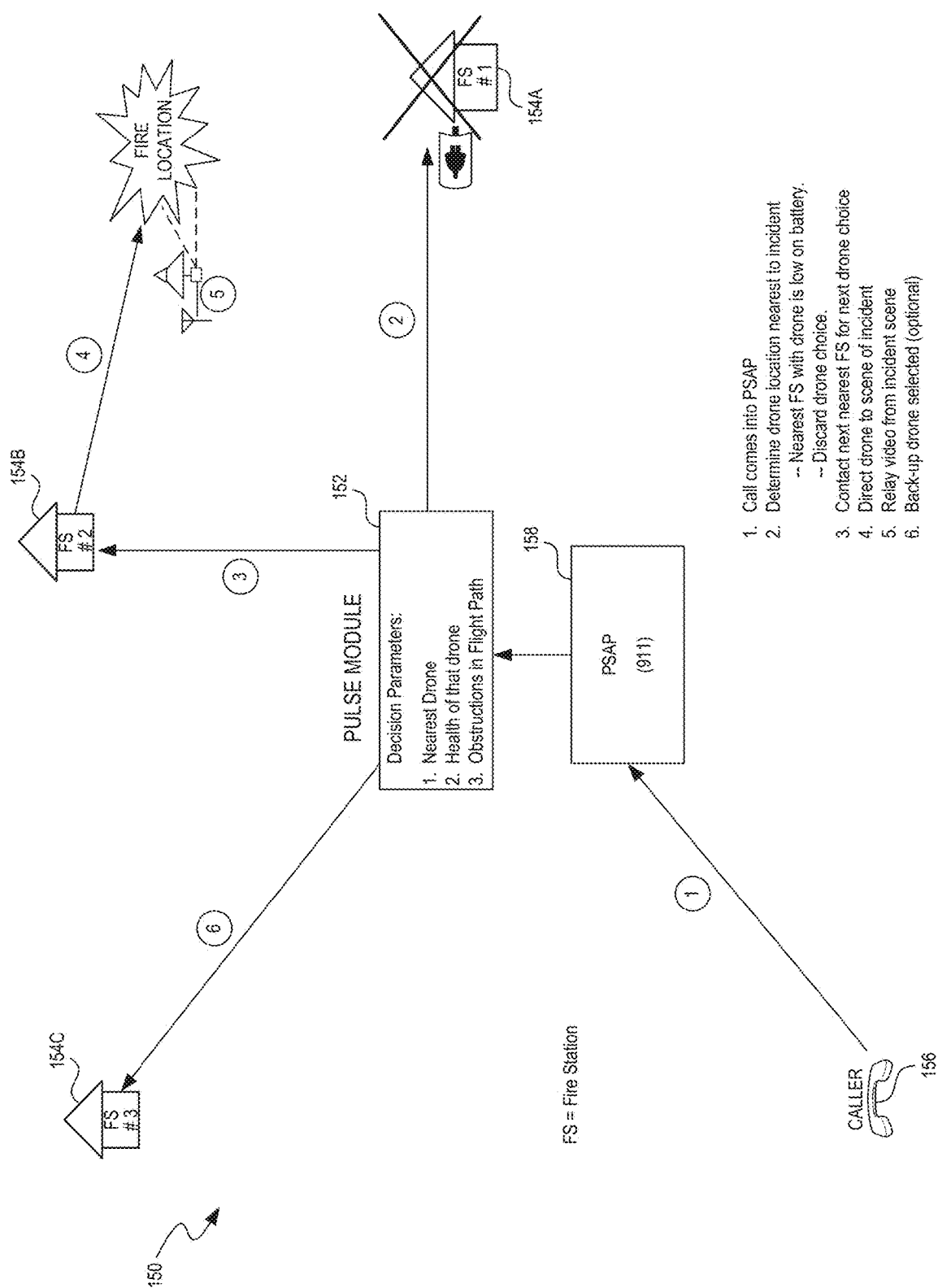
FIG. 1B illustrates an overview of an example scenario of operation of the disclosed technology.

FIG. 1B illustrates an overview of an example scenario of operation of the disclosed technology. The steps of operation are described in brief on FIG. 1B. At step 1, a call from a caller 156 comes into a Public Safety Access Point (PSAP) 158, e.g., via a Public Switched Telephone Network (PSTN) or an Internet Protocol (IP) network. In some embodiments, a call can be a "cry for help" request sent by a caller via a mobile application program running on the caller's mobile phone. Information relating to the call is entered into a database coupled to a computer aided dispatch (CAD) computer. The information relating to the call can include details of the type of the incident, a time of receiving the call, a location of the incident and other suitable details. At step 2, a hosted computer (also referred to herein as pulse module 152) selects a responder drone based on parameters such as location of the drone nearest to incident location, health of the drone, obstructions in the flight path of the drone, or any other suitable criteria associated with the drone. Drones can be located at various geographically-distributed facilities, such as fire stations, police substations, hospitals, military bases, government facilities, etc. In the example scenario shown in FIG. 1B, pulse module 152 determines which drone(s) to deploy.

Although it may intuitively appear that the drone(s) located in closest proximity to the location of the incident are to be selected for deployment, in many instances, that may not be the case. Such as scenario is described in FIG. 1B. In the representative scenario shown in FIG. 1B, fire stations FS #1, FS #2, FS #3 respectively numbered as 154A, 154B, 154C are located at different geographical locations with respect to the incident location. In FIG. 1B, it is assumed that FS #1 is located closest to the incident location. However, for the sake of illustration, it is also assumed that the drone located at FS #1 is running low on battery. Hence, Pulse Module 152, selects (at step 3) a drone at a different location (at FS #2) for deployment at the incident location. At step 4, the drone is deployed to the incident location. At step 5, the drone relays images and video to PSAP, remote dispatchers, and/or on-scene emergency personnel. In some scenarios, optionally, a back-up drone can be selected. The drone deployed to the incident location can handoff its tasks to the back-up drone, e.g., if the health of the drone that is deployed deteriorates or if additional "eyes on the ground" are needed, based on assessment of the circumstances at the incident location.

Conventionally, the flight path of a drone can be classified as a Visual Line of Sight (VLOS) flight path. In a VLOS flight path, the drone's flight path is in visual-line-of-sight of the land-based drone operator at all times. For example, this can imply not flying a drone through clouds or fog, behind trees, buildings or other obstructions. In some applications, VLOS can also imply un-aided vision (except for prescription glasses or sunglasses) of the drone, e.g., not having to use binoculars, telescopes or zoom lenses to see the drone.

According to some disclosed embodiments, a drone's flight can be a Beyond Visual Line of Sight (BVLOS) flight path. In a BVLOS flight path, a drone can be flown without the land-based drone operator/pilot having to keep the drone in visual line of sight at all times. One patentable benefit of these embodiments is in pre-emptively providing situational emergency responsiveness. This can provide better and earlier situational awareness relating to an incident so that a first responder can take informed decisions in addressing the emergency. For example, using BVLOS, first responders are provided with a live video of the scene of an incident scene prior to first responders arriving at the scene of the incident. In some embodiments, a BVLOS flight path is based on data gathered from various sources to identify and avoid obstructions on the flight path, such as airplanes or other drones. Obstructions by known objects in the flight path can be handled by programming the flight path and mission instructions into the mobile platform operating the drone. For identifying airplanes and other drones in the drone's flight path, the drone can be integrated into the national airspace system by using a miniaturized ADS-B compliant transceiver. The transceiver can allow the drone to identify itself to other objects in its flight path and identify other objects in the drone's flight path. Accordingly, this can enable the drone to resolve air traffic separation with other objects in its flight path. Additionally, in some embodiments, the drone can include a miniaturized radar. Data collected from the radar can enable the drone to detect and avoid other ad hoc airspace objects, such as birds and trees. For example, the radar can provide the ability to rapidly and accurately detect hazards, including other aircraft, and instantaneously change the course of the drone. In some embodiments, the radar can be fitted in the nose of the drone. In other embodiments, the radar can be fitted on any suitable part of the drone.

In some embodiments, a drone can be communicatively coupled to Public Safety Answering Point (PSAP) command centers via the FirstNet PS-LTE broadband network (e.g., a portion of the Band 14 spectrum) for command/control of the drone's operations. This can allow the drone to receive/transmit video transmissions, or otherwise any type of machine-to-machine (M2M) communications. The FirstNet PS-LTE broadband network, established by the National Telecommunications and Information Administration (NTIA), provides first responders with a high-speed, broadband network dedicated to public safety. In some embodiments, as a fallback option for connectivity, the drone can also be connected to a cellular network (e.g., 3G and/or 4G LTE). Connectivity to the drones allows drone operators to review/visualize one or more drones in a fleet, audio/video/still image transmitted by the drones, identify available communication options (FirstNet PS-LTE broadband network or cellular network). A command center can also be connected to "No Fly" databases, weather databases, FAA obstacle databases, or other suitable third-party databases to collect pertinent information for a drone's flight plan.

In some embodiments, the drone can be programmed to loiter (or otherwise, "remain") around the location of the incident for a certain time and eventually return to its home base or another suitable location that is considered "mission-safe." The loitering time duration can depend on multiple factors such as health of the drone's battery, speed/direction of the wind on the route to the incident and at the location, a required RF signal strength at the drone to maintain network connectivity using the FirstNet PS-LTE broadband network or cellular network to provide clear video/audio, the number and power consumption of cameras and other on-board sensors on the drone.

In addition to connectivity failure, alternate embodiments of the disclosed technology contemplate different failures and suitable failsafe actions in response to the failures. Examples of failure events can be a failure of a response from the command center to a low battery alarm notification sent by a drone, no response to a loss of GPS/compass alarm notification sent by a drone, or other failure events. The failsafe actions under failure events can be undertaken globally (i.e., for all drones) or for individual drones.

In some embodiments, technology associated with the drone disclosed herein allows for a drone to fly at approximately 60 mph to an incident, hover or loiter for up to 30 minutes over a circular area (or, other suitably-defined geographical area), and then return to its home base at approximately 30 mph, for an average of fifty (50) minutes of total flight time under "normal" conditions. In some embodiments, a drone can loiter while hovering at an incident location. One representative breakdown of the total flight time is as follows:
Launch and climb to altitude—30 sec
Flight to incident—up to 6 minutes
Loiter time—up to 30 minutes
Flight to home—up to 8 minutes (typically at slower speed to conserve battery)
Land and power down—2.5 minutes.
The speeds and times discussed herein are representative examples based on estimated wind conditions and payloads. In alternate embodiments, other speeds and times are feasible based on different values of wind speed and/or payload.) Further details of a drone are described in the discussions that follow.

Figure 2:
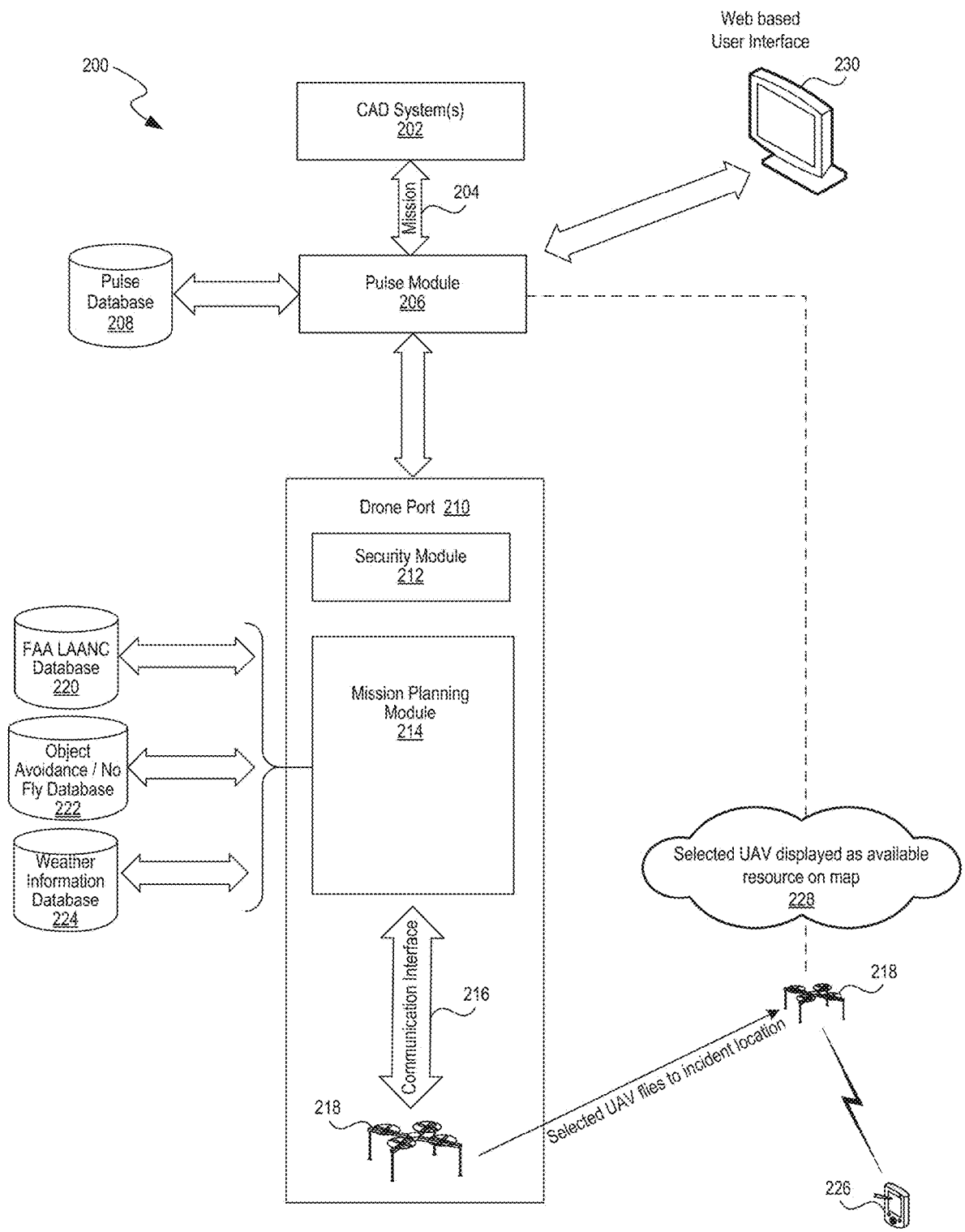
FIG. 2 illustrates exemplary databases associated with decision-making criteria for launching a drone.

FIG. 2 illustrates exemplary databases associated with decision-making criteria for launching a drone. FIG. 2 shows pulse module 206 communicably coupled to one or more CAD system(s) 202, pulse database 208, and a drone port 210. Drone port 210 includes a security module 212 and mission planning module 214.

As shown in FIG. 2, drone 218, when landed in its home base facility, can electrically charge at a charging dock/cradle called as a drone port (e.g., drone port 210). In some embodiments, drone port 210 is a weather-protected assembly for drone 218 and also serves as a "smart" charging station, when drone 218 is docked inside drone port 210. Drone port 210 is "smart" because it can assess the health and welfare of drone 218 and accordingly alert pulse module 206 if drone 218 is unable to fulfill a potential future mission. In some embodiments, drone port 210 is equipped with wireless communications interface(s), thereby allowing pulse module 206 to wirelessly communicate with drone port 210, e.g., for programming a mission into drone 218.

After receiving mission details 204 (e.g., a latitude, a longitude of the incident location, a time of receiving a call, and other mission-related details) from CAD system(s) 202, pulse module 206 determines whether or not a drone needs to be deployed for responding to the incident. If pulse module 206 determines that a drone is needed, then pulse module 206 sends information of the incident location to multiple drone ports located at geographically-distributed facilities. (For the one-drone example shown in FIG. 2, for simplicity of explanations, it will be assumed that pulse module 206 communicates with drone port 210 and further that drone 218 is deployed to respond to the incident.)

Pulse module 206 requests drone port 210 for a set of criteria that would be used by pulse module 206 to determine whether drone 218 can be deployed. Drone port 210 uses information of the incident location to obtain the set of criteria (e.g., from different remote databases) and responds back to pulse module 206. Pulse module 206 selects a drone (e.g., drone 218) based on assessing the set of criteria.

In some embodiments, drone port 210 includes a computer that is configured to locally run a software called mission planning module 214 that controls various operations of drone port 210. In some embodiments, one or more functionalities of mission planning module 214 can be implemented as a remote cloud-based engine that communicates with drone port 210. For example, mission planning module 214 can be involved in conveying local conditions (e.g., weather and battery life) of drone 218 to pulse module 206. FIG. 2 shows that the mission control module 214 is connected to multiple publicly-available and commercial databases for obtaining flight path and weather information. Examples of such databases can be FAA LAANC database 220, object avoidance/no fly database 222, and weather information database 224. Mission planning module 214 communicates the incident location to the object avoidance/no fly database 222. Object avoidance/no fly database 222 informs mission planning module 214 of one or more obstacles and/or restrictions along the flight path of drone

218, if drone 218 were to fly to the incident location. An example of object avoidance/no fly database 222 can be Google database or Jeppesen database. To reduce the time spent flying over people, instructions in the drone's flight plan can treat populated areas or important landmarks as "no fly zones" and as such, avoid them. Mission planning module 214 also communicates with weather information database 224. For example, mission planning module 214 sends information of the location of the incident. Weather information database 224 responds back with the weather at the location of the incident.

In some embodiments, drone port 210 includes a weather station that can determine local weather conditions (e.g., temperature, humidity, dew point, rain/snow/sunny, etc.) at drone port 210. Mission planning module 214 can obtain local weather conditions from the weather station. Mission planning module 214 (sends to pulse module 206) the requested set of criteria such as weather at incident location, local weather at drone port 210, and obstacles and/or restrictions along the flight path to the incident location. Although a single drone port 218 is shown to be connected to pulse module 206, such an illustration is for simplicity in discussion purposes. In alternate embodiments, pulse module 206 can be connected to multiple drone ports at different geographical facilities via communications networks. As a result, in some embodiments, based on the health information, flight path information, weather information associated with multiple drones housed at different geographical facilities, pulse module 206 decides which drone(s) to deploy. Accordingly, pulse module 206 can generate a set of priorities or otherwise rank the deployable drones (based on their response to the requested criteria). The set of priorities can be used in determining which drone(s) to deploy to the incident location.

After pulse module 206 has selected drone 218 to be deployed and prior to launch, mission planning module 214 communicates information identifying drone 218 and flight plan of drone 218 to FAA's Low Altitude Authorization and Notification Capability (LAANC) database (shown as FAA LAANC database 220 in FIG. 2), requesting permission to be launched. (More generally, this database can be a suitable database associated with a jurisdiction and involved in granting permissions to launch drones.) Upon receiving permission to launch from FAA LAANC database 220, mission planning module 214 sends confirmation of the impending launch to pulse module 206. Mission planning module 214 also programs drone 218 with details of the mission, e.g., latitude/longitude of the incident location, information related to one or more obstacles and/or restrictions along the flight path to the incident location, and an actions list or a task list for drone 218. Upon being programmed by mission planning module 214, drone 218 is launched and flies autonomously to the incident location.

Embodiments of the present technology allow for wireless communications between or among drone 218, drone port 210, mission planning module 214, pulse module 206, and external databases. To ensure that messages passed in such communications are not hacked or otherwise compromised, some embodiments (e.g., as shown in FIG. 2) include a security module 212 within drone port 210. Security module 212 encrypts messages passed wirelessly, thereby providing protection against unwarranted data breaches or penetrations by intruders.

In some embodiments, first responders at the location of the incident can locally control operations of drone 218 via one or more mobile electronic devices 226. Such electronic devices can be laptops, cell phones, tablet computers, wearable devices, special-purpose (dedicated), or otherwise any suitable electronic device that is capable of wirelessly communicating with drone 218 using the drone's frequency band, such as the PS-LTE band. In some applications, locally controlled-operations of the drone are based on a role, authorization level, or access privilege of the first responder controlling the drone. For example, a higher level first responder can view and edit a drone's flight path whereas a lower level operator may only be able to view but not edit the drone's flight path. In some scenarios, a drone operator who intends to locally control the operations of the drone at the incident location needs to be cleared or given permissions by pulse module 206. In some scenarios, a first responder at the incident location cannot directly control the drone but is able to communicate messages relating to his or her desired operations of the drone to a remote drone operator, e.g., an operator accessing pulse module 206 via user interface 230. Upon receiving the messages, the drone operator can remotely pilot the drone accordingly.

In some embodiments, pulse module 206 is accessible via a web-based user interface 230. For example, dispatchers and officials associated with a PSAP can review/access/control various functionalities of pulse module 206 and/or drone port 210 via user interface 230. For example, based on analyzing historical data stored in pulse database 208, users can examine the performance of drone 218. In some scenarios, users can review video/images (or, generally any data) transmitted by drone 218 to pulse module 206. This data can be communicated via the FirstNet PS-LTE broadband network (e.g., a portion of the Band 14 spectrum) and can be in real-time data or near real-time. In some embodiments, drone 218 can be equipped with sensors that can enable users to review drone 218 as an available resource 228 on a map. Drone 218 can continuously advertise its path, e.g., via its internal ADS-B transceiver or its telemetry unit, which can be logged into a geocoded database such as Google Earth, Waze, or Flightaware. An application programming interface (API) communicating with the geocoded database can display the location of drone 218 on a map. In some use cases, drone 218 can be owned and operated by a first responder A operating in a geographical region. If the first responder A has a partnership agreement or a collaboration with a first responder B operating in an adjacent or otherwise nearby geographical region, then drone 218 can be shared with first responder B. A partnership can be between different first responders or even different divisions/departments of the same first responder organization.

In some applications, the flight path of a drone can specify boundaries in the form of a geofence that restrict the drone within a geographical area. Creating a geofence increases available battery life margin. For example, a geofence can be created based on a drone flying within five (5) miles of its home base. The size of the geofence can be adjusted based on contractual response areas, jurisdictional boundaries of a first responder, or partnership agreements between partnering first responders.

Figure 3:
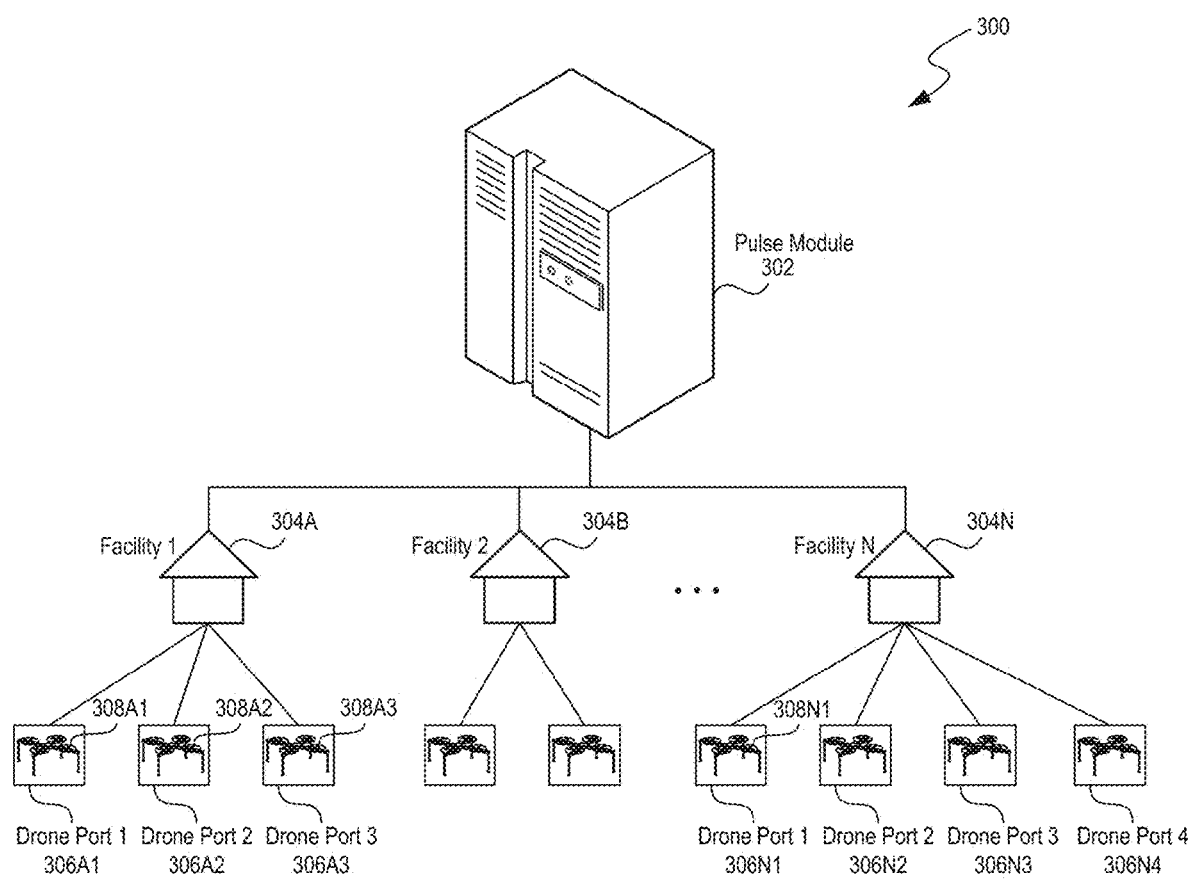
FIG. 3 illustrates a diagram showing drones docked at geographically distributed facilities.

FIG. 3 illustrates a diagram showing drones docked at geographically distributed facilities. These facilities can be fire stations, police stations, electric substations, governmental facilities, medical facilities, or any type of facility. Further, the facilities can be manned or unmanned. Facilities and the equipment therein can be owned and operated by one first responder or by different partnering first responders. FIG. 3 shows pulse module 302 communicably coupled by one or more (wired or wireless) networks to a plurality of facilities such as Facility 1 (304A), Facility 2 (304B), . . . .

Facility N (304N). One or more drone ports can be located at a facility. For example, drone Port 1 (306A1), drone port 2 (306A2), and drone port 3 (306A3) are located in Facility 1. Each drone port typically houses a single drone. For example, drone port 1 houses drone 308A1, drone port 2 houses drone 308A2, drone port 3 houses drone 308A3. At any given time, it is likely that some drones may be deployed to incidents and thus not all drones are docked to the drone ports. Drone ports allow drones to get electrically charged while drones are docked. Further, software such as mission planning module running on drone ports can program a mission into a drone, communicate with pulse module 302, or communicate with external databases. In some embodiments, communications between a drone port and pulse module 302 utilize wired or wireless network(s) associated with a facility. In some embodiments, communications between a drone port and pulse module 302 occur utilize different networks, i.e. different from the network(s) associated with a facility.

Figure 4A:
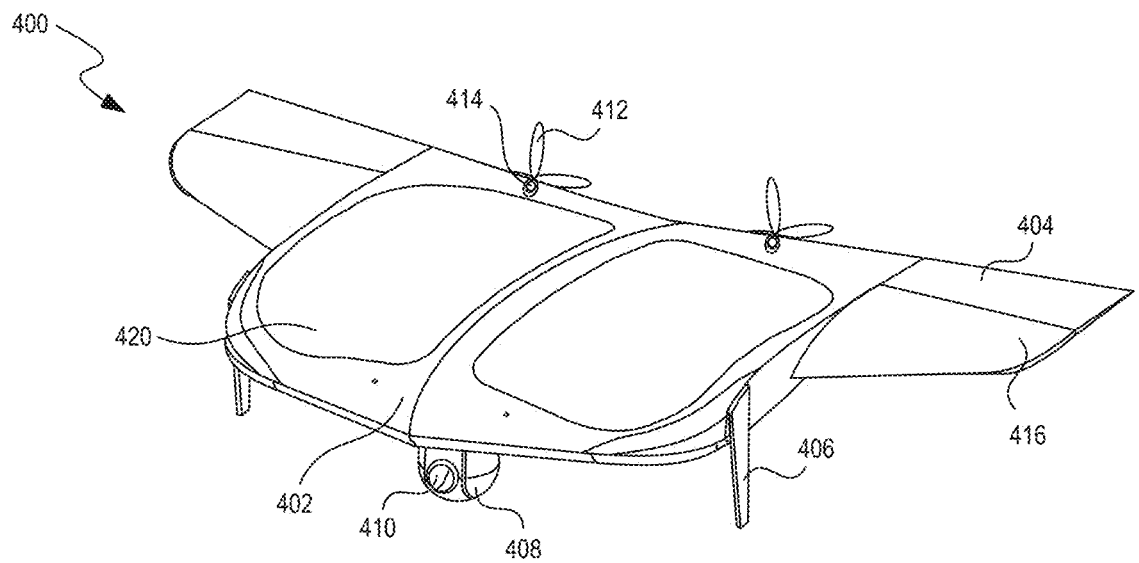
FIGS. 4A-4B illustrate perspective views of a representative vertical takeoff and landing (VTOL) drone.
Figure 4B:
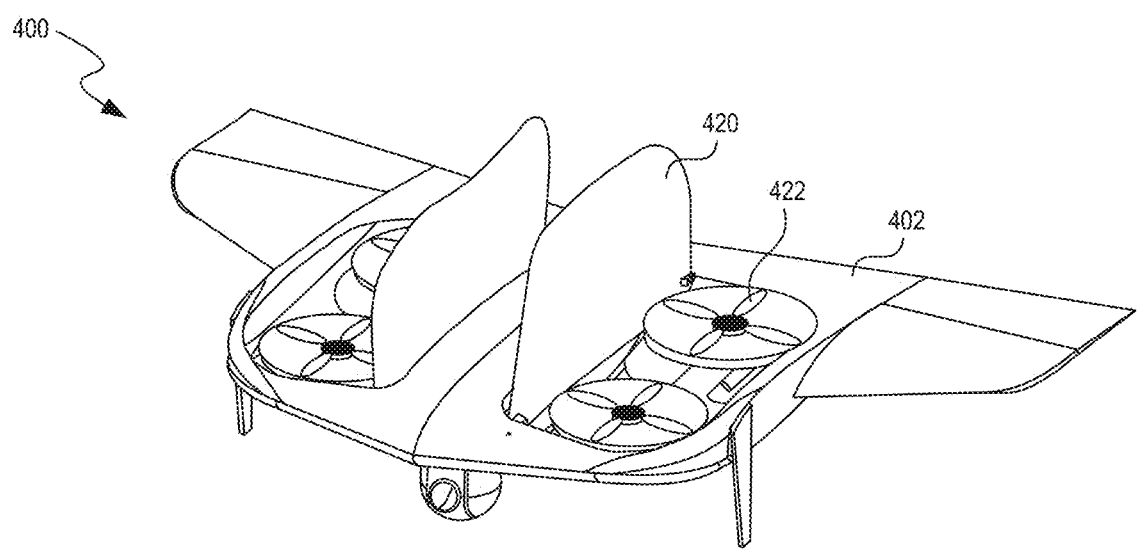

FIGS. 4A, 4B are perspective views of a representative VTOL drone 400 in a flying wing configuration. Drone 400 includes airframe 402 supporting at least a pair of fixed wings 416, at least a pair of landing gear legs 406, movable access doors 420, and a camera 410 attached to gimbal 408. Gimbal 408 allows pan/tilt/stabilization of camera 410. Thus, if drone 400 is hovering at an incident location, gimbal 408 can be positioned to focus on activity at the location to capture images/video. Camera 410 can capture images and/ or video in a 360-degree movement along each of the axes. Any type of camera, e.g., IR, optical, night-vision can be used. As an example, camera 410 may be a 4K Duo Pro color camera manufactured by FLIR. At the rear of drone 400, at least one external rear propeller 412 is included. By providing redundancy of components (i.e., including additional components of the same type), the disclosed technology enhances reliability by avoiding single points of failure. For example, as shown in FIG. 4A, two propellers can be included. In some embodiments, each rear propeller 412 can have a radius of five inches. Each propeller (e.g., rear propeller 412) is attached behind pusher motor 414 to provide horizontal propulsion for pushing forward or otherwise cruising in forward flight. The force provided by the propeller is directed towards the front of drone 400, thereby providing thrust to move or push drone 400 forward. Although in some embodiments, a single pusher motor can suffice, the pair of pusher motors shown in FIG. 4A is provided for redundancy against failure of a motor. As used herein, a "propulsion mechanism" can suggest a propeller and its associated motor, applicable to hover and/or push. Both propulsion mechanism can be controlled/managed by an on-board autopilot computer on drone 400.

Each wing 416 can include a flap 404 for flight control. For example, the lower surface of flap 404 can include various control surfaces. In some embodiments, drone 400 can have a wingspan of 40 inches and weigh 7.0 kilogram. In at least one embodiment, flap 404 can be foldable for ease in transportation and portability. In some embodiments, wing 416 can be entirely foldable. In the front of each wing 416, at least a pair of downward-facing landing gear legs 406 are attached to airframe 402, one on each side of drone 400. Landing gear legs 406 function as a forward landing skid and can include charging contact points for conduction-based charging of the drone's batteries, when the drone is docked onto charging pads at a drone port. Drone 400 includes at least a pair of movable access doors 420 located on the upper surface of airframe 402 and symmetrically distributed about a central longitudinal axis of airframe 402.

Movable access doors 420 include movable door panels pivotally disposed on airframe 402 such that they can externally open in a direction perpendicular to the upper surface of airframe 402. These doors stay open during vertical takeoff but remain tightly closed (e.g., sealed to the airframe) during forward flight. In some embodiments, movable access doors 420 occupy a substantial portion of the surface of airframe 402 and can switch between an open position and closed position (or vice versa) depending on whether drone 400 is vertically taking off, flying horizontally, or vertically landing.

FIG. 4B reveals a perspective view of representative VTOL drone 400 with movable access doors externally open exposing at least two pairs of propellers 422 facing vertically upwards. Drone 400 can include at least a pair of movable access doors 420 located on the lower surface of airframe 402 and opening externally in a direction perpendicular to the lower surface of airframe 402. Thus, movable access doors 402 function as an aerodynamic surface of drone 400 when in the closed position. In some embodiments, the airframe 402 can include permanent openings below each propeller 422. Airframe 402 can be made of carbon fiber, titanium, aluminum, fiberglass, foam, or other materials appropriate for aircraft construction. In addition to being electrically conductive, airframe 402 can also provide cooling functionalities to the internal circuitry of drone 400.

The description of FIGS. 4A and 4B illustrates various advantages in the design of drone 400. Firstly, by providing redundancy of multiple components, such as extra motors, extra propellers, dual batteries, etc., the design provides greater reliability of operation, under failure conditions. Alternate embodiments of the drone can have any number of propellers, pusher motors, hover motors, cameras, batteries or movable access doors. For example, in some drone embodiments, a drone can have four movable access doors on the upper surface and four movable access doors on the lower surface. In other drone embodiments, a drone can have two movable access doors on the upper surface and four movable access doors on the lower surface.

As one benefit of providing redundancy, a drone with one or more failed components can rely on its additional (redundant) components to safely return to its home base, eliminating or minimizing the probability of a crash. If a drone crashes, not only is there loss a financial loss from the loss of a drone, but additionally a drone can cause damage to lifes and property when it crashes into a populated area. In another example of the benefits of redundancy, for a scenario where 100% healthy drones are not available to be deployed to an incident, redundancy provides a drone operator with at least an option to deploy a "partially healthy" drone. Depending on the severity of the incident, such an option can sometimes help in avoiding significant damages to lives and property.

In other aspects, this design facilitates internal/external components of the drone to maintain its attitude (e.g., remain horizontal) during hover and forward flight, and also provides low center of gravity when the drone is landed. Maintaining the same attitude provides better quality of video/images, or otherwise data captured by the sensors, because of zero or minimal jitter. Further, this design facilitates the drone to vertically take off and land in a precise manner, i.e., provides VTOL functionality. Additionally, this design allows the drone to lift, fly forward, and land at higher speeds than conventional drones. Also, this design increases the drone's forward flight range, e.g., the drone can fly over longer distances without having to return to base.

Among other advantageous aspects, the afore-mentioned design provides increased efficiency, especially under windy conditions when the wing can be used to provide lift. For example, in some embodiments, the disclosed technology consumes 133 W of electrical power while hovering, and provides a hover efficiency of greater than 80%. Hover efficiency is defined as the ratio of total mechanical power generated by the motors to total input electrical power provided by the batteries.

Figure 5A:
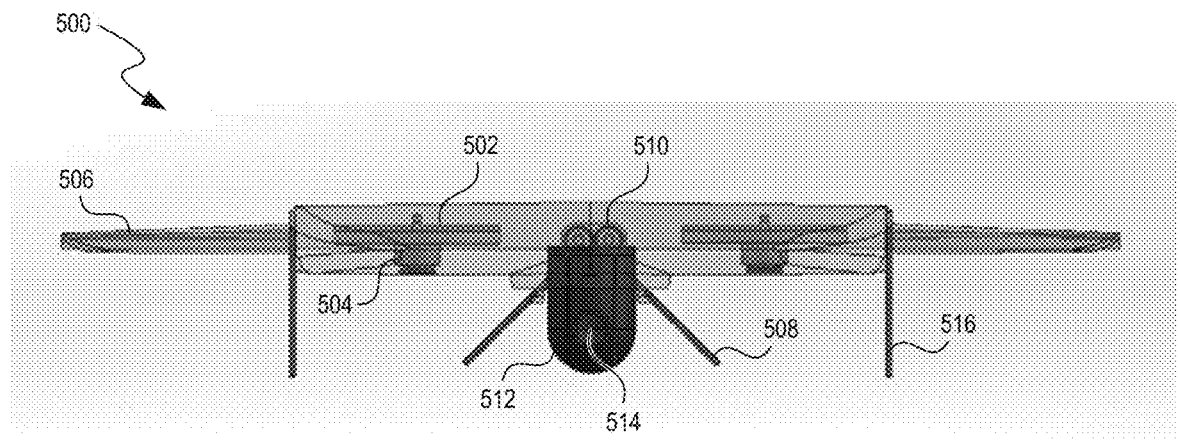
FIG. 5A shows a cross-sectional front view of the representative VTOL drone of FIGS. 4A-4B.

FIG. 5A shows a cross-sectional front view of a representative drone 500. Drone 500 includes at least a pair of wings 506, camera 514 attached to gimbal 512, and at least a pair of stabilizer fins 508 at the rear of drone 500. The pair of stabilizer fins 508 are shaped like in an inverted V and can function as a landing skid for the drone. FIG. 5A shows at least a pair of vertically facing propellers 502 attached to a pair of hover motors 504. In some embodiments, propellers 502 can have a radius of six inches. Propeller 502 faces externally.

In some embodiments, representative drone 500 includes a total of eight hover motors attached to eight propellers. Four propellers can be externally facing upward and parallel to a horizontal plane of the airframe and four propellers can be externally facing downward and parallel to the horizontal plane of the airframe. Further, the motors can be located internal to the propellers and facing each other. For example, two pairs of motor-propeller combination (i.e., including two hover motors and two propellers) can be aligned in an axially stacked layout with two hover motors facing each other internally and each propeller facing externally. It will be appreciated that this type of design provides redundancy in avoiding complete shutdown. In the event that one or more hover motors malfunction, the redundancy in hover motors can allow the drone to still be able to hover for a certain time duration, before landing. Counter-rotating stacked rotors can help with stability as well. FIG. 5A also shows landing gear leg 516 for landing and batteries 510 for powering drone 500. The pair of wings 506 is similar to the pair of wings 416, camera 514 is similar to camera 410, landing gear leg 516 is similar to landing gear leg 406, and gimbal 512 is similar to gimbal 408, in connection with FIGS. 4A, 4B. Gimbal 512 can be a stand-alone gimbal that can support any camera. In some embodiments, gimbal 512 is resistant to dust, water, or other liquids, providing robustness in all types of environmental conditions. Not only the gimbal, but the disclosed drone as a whole can withstand a wide range of temperatures, from 0 degrees Fahrenheit to 110 degrees Fahrenheit, thereby enhancing its robustness.

Figure 5B:
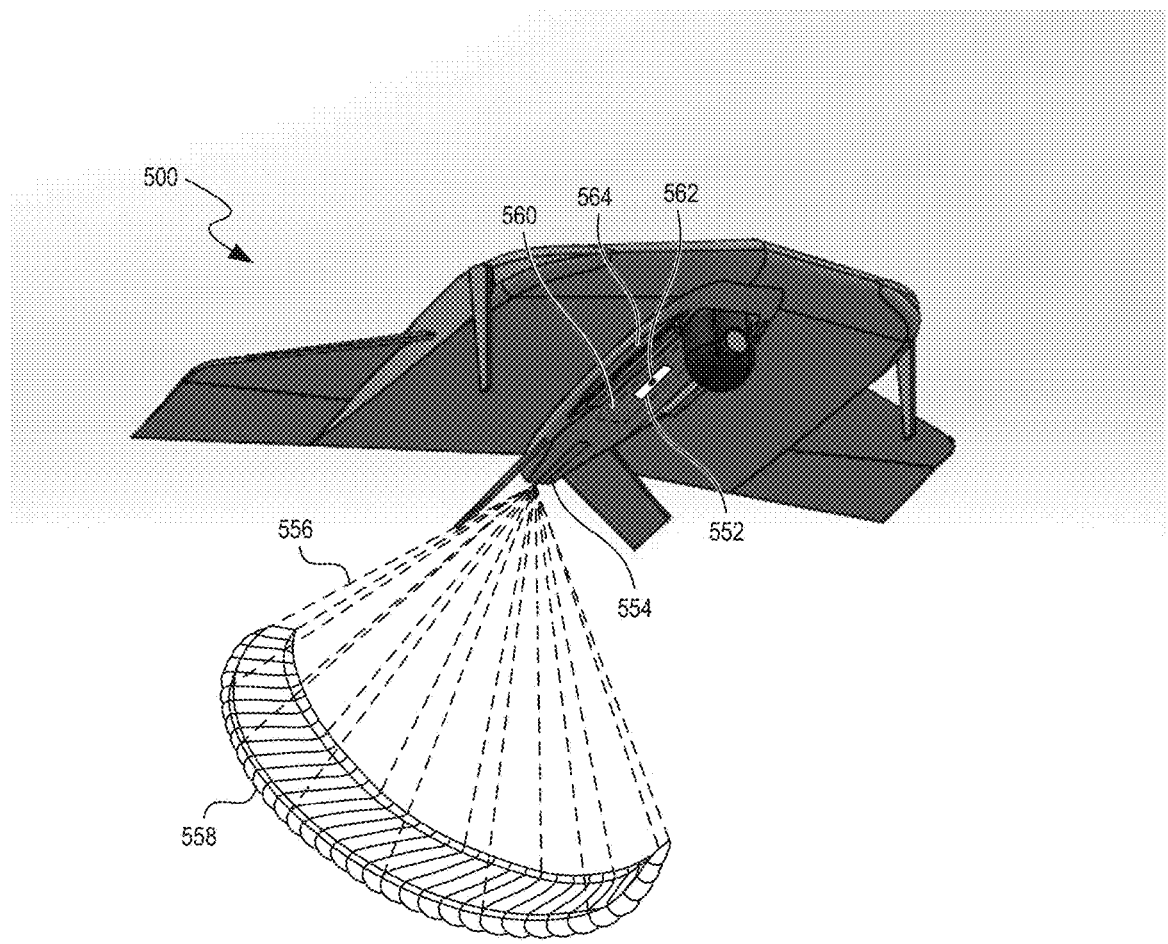
FIG. 5B illustrates another perspective view of the representative VTOL drone of FIGS. 4A-4B.

FIG. 5B shows a side perspective view of representative drone 500. The side perspective view in FIG. 5B shows details in the undercarriage of the drone. For example, the undercarriage of the drone shows region 554 enclosing the emergency recovery system, an externally accessible payload port 552, and rails 564 for carrying payloads. According to some embodiments, the disclosed drone is equipped with an emergency recovery system for responding to unforeseen failure events, e.g., in the event of a complete failure of the autonomous flight guidance system. In such a failure event (e.g., a "mayday" event) drone 500 is equipped with an emergency recovery system that deploys parachute 558 attached to cords 556, thereby preventing the drone from crashing or freely falling under gravity. Parachute 558 (in collapsed form), cords 556, and one or more other components associated with the emergency recovery system may be stored inside region 554 of the drone. (Details of the emergency recovery system are discussed in connection with FIG. 6). The disclosed emergency recovery system thus provides enhanced reliability of the drone by over-riding normal operations to allow the drone to land safely, thereby preventing damage to the drone. Further, the emergency recovery system provides cost savings by allowing the drone to be reused for future missions after appropriate replacement or repair of the parts/components that were subjected to failure due to the mayday event. A carriage including rails 564 can include two aluminum channels (e.g., along two sides of the gimbal) resembling an aircraft C track. For example, rails 564 can carry/accommodate additional cameras or sensors. Payload port 552 is an electrical port/interface that provides one or more connectors for data and power. For example, payload port 552 can include a 5 V power connector, a USB connector, or other suitable electrical connectors for powering the drone and/or communicating with the internal circuitry of the drone. This can be advantageous for faster (wired) data exchanges, upgrades to the drone's software/firmware, maintenance checks, services, and the like.

Figure 6:
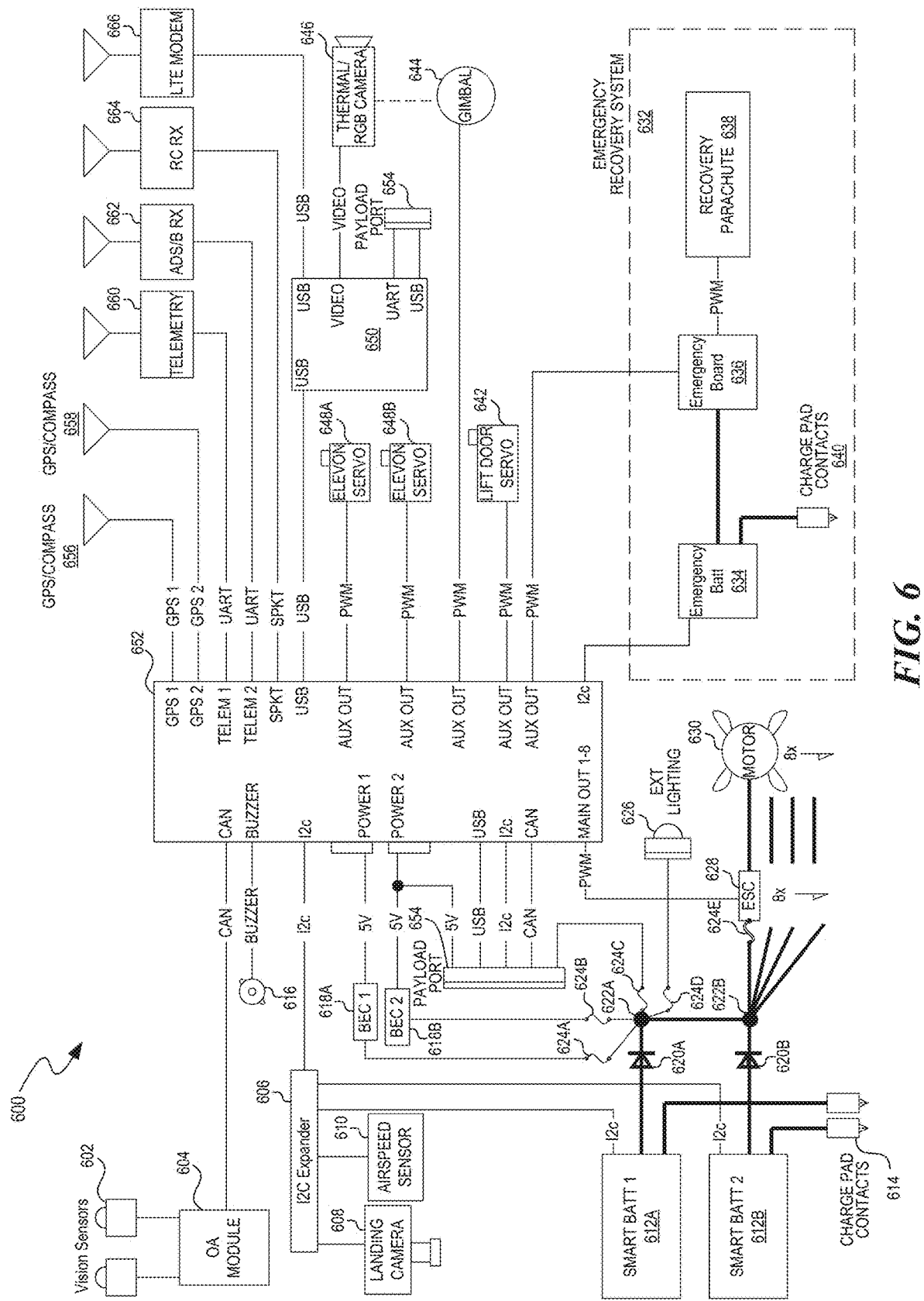
FIG. 6 shows a schematic block diagram of various circuit components of the representative VTOL drone of FIGS. 4A-4B.

FIG. 6 shows a schematic block diagram of various circuit components of a representative drone. For example, FIG. 6 illustrates multiple electrical and mechanical components connected to base processor 652. (Processor 652 is referred to herein as "base" processor because of the presence of at least another "ancillary" processor (e.g., processor 650 shown in the schematic in FIG. 6). Base processor 652 is on-board autopilot or, a flight controller that controls a significant portion of a drone's operations. For example, base processor 652 is capable of autonomously flying a drone, including takeoff and landing. An example of base processor 652 can be Pixhawk 2. Pixhawk 2 includes three inertial measurement sensors (IMUs) internally for measuring various flight parameters related to the drone's movement. The firmware running on the Pixhawk 2 can be proprietary or open source such as PX4 or ArduPilot. One advantage of the disclosed technology is that the drone is fully autonomous and does not require any human intervention for flight path planning.

FIG. 6 shows base processor 652 coupled to obstacle avoidance module 604 via a controller area network (CAN) bus. Obstacle avoidance (OA) module 604 are coupled to at least a pair of vision sensors 602 to detect and avoid obstacles. Vision sensors 602 are mounted on the drone such that they point forward for capturing vision information (e.g., in the form of optical and/or infra-red (IR) imagery) external to the drone. For example, vision sensors 602 can capture imagery indicating an approaching aircraft, the OA module 604 can processes the captured imagery, and inform base processor 652 of obstacles in the drone's flight path. In addition to obstacles in the air, vision sensors 602 and OA module 604 can also detect obstacles located on the ground. OA module 604 applies machine learning methodologies for processing images/video captured by vision sensors 602. An example of OA module 604 is the IRIS OA module manufactured by IRIS Automation Inc. Buzzer 616 is connected to base processor 652 for sounding warning tones, e.g., during takeoff and landing. I2C expander 606 connected to base processor 652 provides a simple, cost-effective way of multiple peripheral devices to be controlled by base processor 652. As shown in FIG. 6, I2C expander allows expansion of a single I2C bus from base processor 652 and connects base processor 652 to landing camera 608, airspeed sensor 610, and at least a pair of smart batteries 612A, 612B.

Landing camera 608 (a downward-facing optical device located typically located in the undercarriage of a drone) enables precision landing of the drone, based on receiving IR or LED signals from a landing surface. For example, the landing surface can be on a drone port and the IR signals can be transmitted by an IR beacon from the drone port. Landing camera 608 utilizes visual recognition technology to identify and track static and moving objects. An example of landing camera 608 can be the Pixy camera from Charmed Labs.

Airspeed sensor 610 is a sensor (typically located on the drone's external surface pointing forward) for measuring a differential air pressure, i.e., a difference between static air pressure and ram air pressure. The ram air pressure is the air pressure impinging the drone.

Smart batteries 612A, 612B provide power for operating the mechanical and electrical parts of the drone. Under normal operating conditions (i.e., no failure) both smart batteries 612A, 612B are used, working in parallel. A "smart" battery is a battery that runs a firmware called a battery management system (BMS), which can communicate one or more battery-related parameters such as (but not limited to) voltage, current, temperature, faults, capacity used, energy stored, discharge rate, etc. to components that are external to the battery. For example, smart batteries 612A, 612B periodically, intermittently, or on request can communicate electrical parameters to base processor 652 during takeoff, landing, and in-flight. In an event when base processor 652 determines that the power remaining in smart batteries 612A, 612B is low, then base processor 652 can issue a "return to base" command to return back to the drone's home base. In some embodiments, a single smart battery may be sufficient. However, to provide redundancy against unforeseen failure of a battery (so that the drone can still return to base) and to facilitate flight paths of longer duration, two or more smart batteries can be utilized in some embodiments. In addition to being connected to base processor 652, smart batteries 612A, 612B are connected to a pair of junction points 622A, 622B and charge pad contacts 614. Diodes 620A, 620B are placed on the respective paths between smart batteries 612A, 612B and junction points 622A, 622B for isolating a smart battery from the rest of the circuit in the event that one or both smart batteries fail. This would cut off the failing smart battery (or, smart batteries) from causing damage to other circuit components. As an example, if smart battery 612A fails but smart battery 612B is operational, voltage appearing on the output of smart battery 612A (i.e., to the left of diode 620A) may be lower than voltage appearing at junction point 622A. By placing diode 620A at the output of smart battery 612A, current from (working) smart battery 612B will be prevented from flowing into (non-working) smart battery 612A. Further, on detecting lower voltage at the output of smart battery 612A, the battery management system on smart battery 612A can inform base processor 652 about the low voltage condition. In some embodiments, each smart battery is essentially a "battery pack" including eighteen individually rechargeable cells. The eighteen cells can be arranged in a manner such that 6 cells are in series and 3 are in parallel. As an example, each cell in an eighteen-cell smart battery can be a 18650-30Q cell manufactured by SAMSUNG ELECTRONICS. Each smart battery 612A can provide a DC supply of 24 V and deliver a current of approximately 18 A.

Charge pad contacts 614 allow smart batteries 612A, 612B to get charged when the drone is docked onto charging pads located inside a drone port. During charging, the battery management system on a smart battery actively monitors the voltage at charging pad contacts 614 and terminates ("shuts off") charging of smart batteries 612A, 612B when charging is complete.

Junction points 622A, 622B are electrical junctions that connect smart batteries 612A, 612B to motors 630 via electrical speed controllers (ESC) 628. In some embodiments, motors 630 can be small, brushless, and DC-powered DC. Each motor is controlled by an ESC for controlling the power flowing through a motor. Base processor 652 can control the power supplied to a motor by sending a pulse width modulation (PWM) signal to the ESC coupled to the motor. Base processor 652 can monitor the temperature, speed, power and other parameters of each motor via the ESC associated with the motor. In some embodiments, a drone can be equipped with eight motors and thus base processor can individually control the power input to each of the eight motors. Accordingly, there can be eight ESCs in such embodiments. An example of a motor can be the T-MOTOR manufactured by the T-motor Company.

Current from a smart battery (say smart battery 612A) flows through I2C expander 606, into base processor 652, out through battery eliminator circuits (BEC) 618A, 618B, through one or more fuses, and then to a motor via its associated ESC. BECs 618A, 618B distribute electric power from a battery to multiple electronic peripherals and function as a regulated DC power supply (e.g., 5 V). In some embodiments, a single BEC can be sufficient. Two or more BECs provide redundancy in avoiding complete breakdown.

Under normal operating conditions, smart batteries 612A, 612B also provide power to external lighting 626 (such as one or more LEDs) via I2C connections. In some embodiments, base processor 652 can control the brightness of external lighting 626 directly or via commands sent to the battery management systems on smart batteries 612A, 612B. Fuses 624A, 624B, 624C, 624D, 624E provide protection to base processor 652 under short circuit conditions, e.g., a propeller flies off the drone and shorts any of BEC 618A or BEC 618B, the external lighting 626 fails, one or more motors stop working, or any electrical/mechanical failure event(s). In such an event, the short would cause one or more fuses to blow without damaging any electrical component or causing any fires. Thus, embodiments of the disclosed technology provide adequate failsafe measures in response to failure conditions, thereby enhancing the reliability of operation of the drone.

Base processor 652 is also connected to emergency recovery system 632. Emergency recovery system 632 includes emergency battery 634, emergency board 636 (a/k/a "mayday" processor) and recovery parachute subsystem 638 (that houses a folded recovery parachute inside a canister under normal conditions). Workings of emergency recovery system 632 are similar to the emergency recovery system described in FIG. 5B. Emergency recovery system 632 can be activated by a PWM signal sent by base processor 652 to emergency board 636. Emergency board 636 can launch the recovery parachute by sending a PWM signal to recovery parachute subsystem 638. Emergency recovery system 632 is powered by its own dedicated battery, e.g., emergency battery 634 that is separate from smart batteries 612A, 612B to ensure independent power supply to the components of emergency recovery system 632. Charge pad contact 640 allow emergency battery 634 to get charged when the drone is docked onto charging pads located inside a drone port. Emergency recovery system 632 can be activated by a PWM signal from base processor 652. For example, base processor 652 can instruct emergency board 636 to launch recovery parachute 638, based on the drone's attitude as sensed by one or more IMUs internally located inside base processor 652. In some scenarios, e.g., when base processor 652 has failed or is non-responsive, emergency board 636 can make its own determination to activate emergency recovery system 632. The determination to activate emergency recovery system 632 is based on the attitude of the drone. If base processor 652 or emergency board 636 determines that the attitude of the drone has exceeded a threshold value, then emergency recovery system 632 is activated. Thus, both base processor 652 and emergency board 636 can independently monitor the drone's attitude. Emergency recovery system 632 includes dedicated accelerometers and other sensors that continuously (or, periodically) monitor the drone's attitude. Thus, either base processor 652 or emergency board 636 (or, both) can trigger the launch of recovery parachute 638. In some instances, launching recovery parachute 638 is associated with a visual and/or audio notification. For example, emergency recovery system 632 can include a dedicated buzzer and/or lighting which go off, causing vehicles and people nearby to move out of the parachute's trajectory. In some instances, emergency board 636 can transmit a beacon signal (e.g., an IR or optical signal) indicative of a last-reported time and geographical location of the drone's existence. Upon receiving the beacon signal, a ground computer (e.g., at a pulse module or at a PSAP) can notify a ground operator, thereby allowing the rescue of the drone to focus in the vicinity of the last-reported geographical location. In some embodiments, in addition to the beacon signal, emergency board 636 can transmit an audible warning tone of an impending parachute landing of the drone, in lieu of, or in combination with strobe LEDs. In some embodiments, emergency board 636 can be equipped with an emergency locator transmitter (ELT), which upon being triggered by the emergency board 636 transmits a distress signal over specified frequency bands.

Base processor 652 communicates with lift door servo 642 (for controlling the operation of a movable access door) via a PWM signal. In typical implementations, if there are a total of four movable access doors (two at the top surface and two at the bottom), then these implementations can include four lift door servos 642, each controlled by base processor 652. Elevon servo motors 648A, 648B power the control surfaces on each winglet in the pair of winglets and are used during forward flight of the drone. Elevon servo motors 648A, 648B are activated by a PWM signal from base processor 652. In some embodiments, additional elevon servo motors can be used for redundancy purposes, in order to avoid a single point of failure.

In addition to base processor 652, FIG. 6 shows that the drone also includes an ancillary processor 650 that provides additional functionality. An example of ancillary processor 650 can be the Raspberry Pi Zero Watt processor. Besides providing redundancy in events when base processor 652 fail, ancillary processor 650 can process video/image, audio, environment data, or otherwise any data captured by the drone. For example, FIG. 6 shows ancillary processor receiving thermal and/or optical (RBG) video data captured by camera 646, which can be further sent to base processor 652 via the USB connection between base processor 652 and ancillary processor 650. This would enable base processor 652 to have access to the camera data. Camera 646 is attached to gimbal 644 for stability for about 60-degree movement along each axis. Movement of gimbal 644 is controlled by base processor 652 using a PWM signal. In some embodiments, ancillary processor 650 can perform various image processing functions such as cropping, stitching, image stabilization of captured video/images, or any appropriate image processing function as will occur to one skilled in the art. Further, in some applications, ancillary processor 650 can monitor smart batteries 612A, 612B, or otherwise perform monitoring/control of one or more circuit components, as necessary. Because ancillary processor 650 is connected to payload port 654 which is connected to smart batteries 612A, 612B, ancillary processor 650 can control the brightness of external lighting 626 directly or via commands sent to the battery management systems on smart batteries 612A, 612B. Ancillary processor 650 is connected to payload port 654 via universal asynchronous receiver-transmitter (UART) and USB buses. Payload port 654 provides power connectors and various data connectors (such as USB, I2C, CAN) for allowing external access to the base processor 652 and ancillary processor 650. (The external side of payload port 654 is shown as element 552 in FIG. 5B.) FIG. 6 also shows the same payload (e.g., payload port 654) connected to base processor 652 and junction point 622A. Thus, payload port 654 can allow wired data exchanges with ancillary port 650 and/or base processor 652. Further, payload port 654 allows external wired connections to the smart batteries, e.g., for check their power/health.

Embodiments of the disclosed technology provide multiple channels of communications between the drone and the external world. For example, any of telemetry unit 660 or LTE modem 666 can convey information between the drone to the external world, e.g., the pulse module, air traffic controllers, ground personnel, or other entities. At any of the above-mentioned entities, a computer communicating with the drone can log into a database the information sent/streamed by the drone. LTE modem 666 is connected to ancillary processor 650 via a USB connection. LTE modem 666 can communicate telemetry information such as the drone's control/monitoring data, video/images, or generally any data to the external world. LTE modem 666 operates on the Internet Protocol (IP network) for exchanging information with a LTE-equipped base station, e.g., at a drone port, or at a pulse module. In order to tap into an LTE network, the drone can include an LTE SIM card. The LTE SIM card can enable the drone to identify itself uniquely, and ensure communications between a LTE-equipped base station and LTE modem 666. An example of LTE modem 666 can be the Toby-R2 LTE Modem manufactured by U-Blox. Although FIG. 6 shows a LTE modem, in alternate embodiments, other wireless modems can be used. For example, in embodiments that employ the FirstNet PS-LTE band, the LTE modem can be replaced by a suitable PS-LTE modem. In some embodiments, LTE modem 666 can be replaced by a universal modem that operates on multiple wireless bands such as LTE, 3G, 2G, WiFi, and PS-LTE. An example of a universal modem is Sonim XPi manufactured by Sonim Technologies.

When the drone is docked in a drone port, ancillary processor 650 has additional options (e.g., besides telemetry unit 660 or LTE modem 666) to communicate with the drone port or, software running on the drone port. Ancillary processor 650 can internally include a Wifi modem or a Bluetooth modem. Any of these modems can be used to communicate with the drone port. Thus, it can be appreciated that providing multiple wireless communication links between the drone and the external world (including the drone port) provide enhanced reliability compared to a single link.

Base processor 652 is connected to RC receiver 664 via a Secure Port Knock Tunneling (SPKT) connection. RC receiver 664 allows base processor 652 to wirelessly receive external instructions wirelessly, e.g., for testing the drone when an external operator intends to manually fly the drone. For example, RC receiver 664 can communicate with an RC transmitter associated with a drone port. This may be beneficial for a maintenance person to test/fly the drone locally. An example of RC receiver 664 can be the RC receiver manufactured by Spektrum.

The drone obtains GPS information (e.g., from the drone port) via at least one GPS receiver/compass. In some embodiments, one GPS receiver can suffice. For purposes of redundancy, dual GPS receivers can be used, e.g., GPS receivers 656, 658 as shown in FIG. 6. To enhance the accuracy/precision of GPS data derived from a satellite, one or both GPS receivers can also provide real-time kinematic (RTK) positioning. In some embodiments, GPS receivers 656, 658 derive independent GPS signals from a satellite to identify the drone's location. Based on the received signal, one of the receiver can calculate an estimated error in the drone's location, and send the estimated error through telemetry unit 660, further enhancing the accuracy of the drone's location. This continuous feedback of error estimation can advantageously result in fine precision in the drone's location information, e.g., providing an accuracy of a few centimeters. An example of GPS receiver 656 or 658 can be the Here+ RTK GPS/Compass manufactured by Hex technology. In embodiments with two GPS receivers, one or both receivers can be equipped with RTK functionality.

For identifying airplanes and other drones in the drone's flight path, the drone can be integrated into the national airspace system by using a miniaturized ADS-B compliant transceiver such as ADS-B transceiver 662. The drone periodically or intermittently communicates with a remote ADS-B transceiver of the FAA (or, generally aviation authorities of jurisdictions) via ADS-B transceiver 662. Information exchanged between transceiver 662 and the remote ADS-B transceiver can allow the drone to identify itself to other objects in its flight path and also obtain information about other objects in its flight path. Accordingly, this enables the drone to resolve air traffic separation with other objects in its flight path. For example, the information exchanged can be a closure rate of an approaching aircraft or a bearing of another aircraft. Base processor 652 communicates with ADS-B transceiver 662 internally via a UART connection. An example of transceiver 662 can be the PING ADS-B transceiver manufactured by uAvionics Corporation.

Base processor 652 communicates telemetry information to the external world via telemetry unit 660. Base processor 652 communicates with telemetry unit 660 internally via a UART connection. As an example, telemetry unit 660 can transmit telemetry information upto a maximum range of 25 miles. An example of telemetry unit 660 can be RFD 900+ Long Range Telemetry manufactured by RF Design Pty Ltd. In some embodiments, telemetry information from the drone can be communicated to a telemetry unit located on the drone port. Several advantages of the disclosed drone port and associated details will be better understood in the discussions that follow.

Figure 7A:
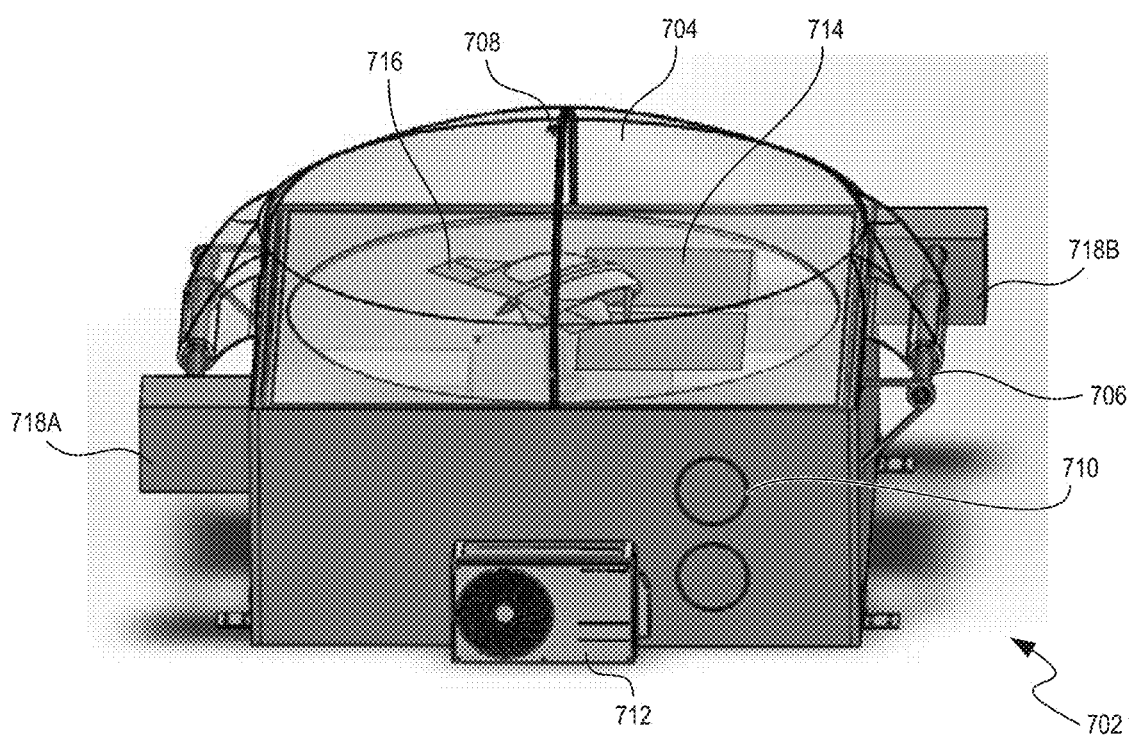
FIG. 7A shows a perspective view of a representative drone port for docking a drone.
Figure 7B:
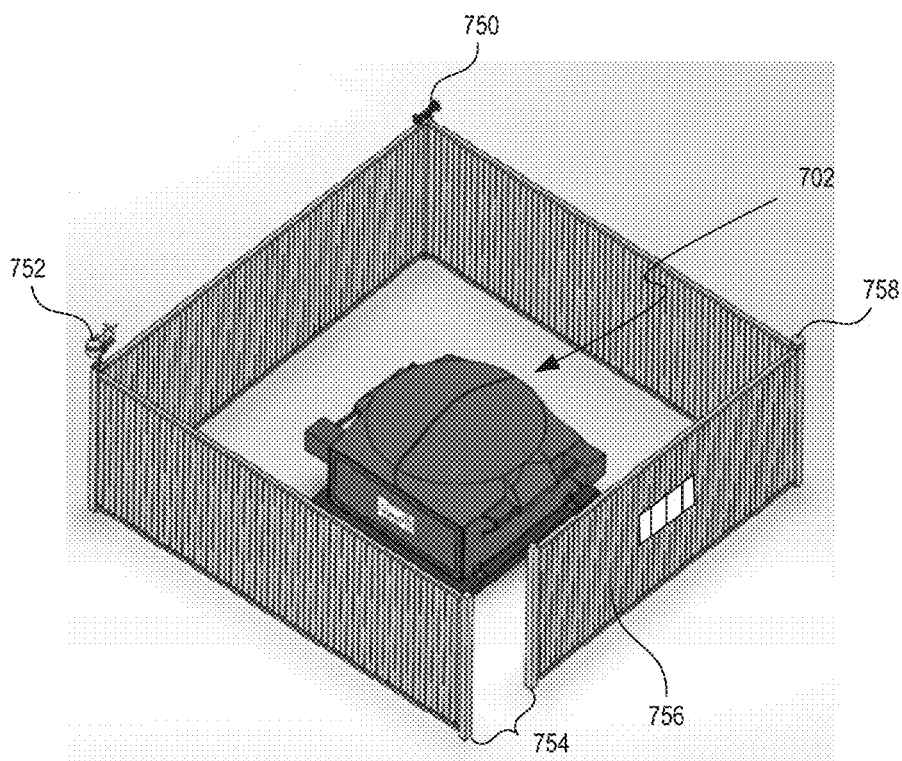
FIG. 7B shows a perspective view of the representative drone port of FIG. 7A enclosed inside a fence.

FIGS. 7A-7B show perspective views of a representative drone port 702 in a fully closed configuration. Drone port 702 includes exposure doors 704 on its upper surface, motor housings 718A, 718B for enclosing one or more motors/mechanical components that operate the landing assembly, and hinges 706 on the side of drone port 702 for supporting the opening and closing of port exposure doors 704. Port exposure door 704 on the upper surface of drone port 702 is typically made with RF-transparent material (such as fiberglass) so that drone 716 can receive/transmit communication (e.g., GPS) signals. In some embodiments, the top (upper surface) of the drone port can be shaped like a dome that is split in the middle, e.g., as shown in FIGS. 7A, 7B. Drone port 702 also includes at least a pair of air exchange holes 710 that can be connected to the HVAC system at the facility. Motors included within drone port 702 control the opening and closing of exposure door 704. Drone port 702 also includes overhead camera 708 attached to exposure door 704 and facing drone 716. Camera 708 can capture video/images of drone 702 (in real-time or otherwise) when the drone is taking off, landing, or docked at drone port 702. Thus, users of pulse module can see (e.g., via a user interface) live video/images of drone 716. In such embodiments, camera 708 can be an internet protocol (IP) camera that can communicate with a router/modem included within drone port 702. This would allow the router/modem to stream the video/images of drone 716, e.g., via the FirstNet PS-LTE broadband network or other suitable network(s). Drone port 702 can be placed anywhere at a facility. For example, it can be placed on the ground, on the roof, or otherwise any horizontal platform. One advantage of the disclosed drone port is that it is a compact unit and occupies less space. For example, one embodiment of the disclosed drone port measures 5.5 feet×5.5 feet×4 feet. To provide protection from dust and weather elements, the edges of the drone port are rubber-sealed.

In addition to getting connected to the facility's HVAC unit via air exchange holes, some drone port embodiments can have their own dedicated HVAC unit. For example, as shown in FIG. 7A, drone port 702 includes dedicated HVAC unit 712 for maintaining the internal temperature inside drone port 702 within a certain range, e.g., between 50 degrees and 85 degrees Fahrenheit. In some embodiments, HVAC unit 712 is enclosed within a chamber that is thermally insulated chamber with foam. Internally, drone port 702 includes at least a pair of charging pads 714 for providing electrical charge to drone 716 when docked. Although FIG. 7A shows drone port 702 as having a transparent (e.g., fiberglass) top dome, this is for illustration and discussion only. In some embodiments, a portion of, or the entire drone port 702 can be made of translucent, or semi-transparent material that allows microwave and/or GPS signals to pass. In some embodiments, a motion detector can be placed on port exposure door 704 or on the upper surface of drone port 702. In some embodiments, the top dome can be thermally insulated using spray foam.

FIG. 7B shows a perspective view of a drone port 702 located inside an enclosure 756. Enclosure 756 (e.g., made of vinyl and having dimensions 15 feet×15 feet) allows the drone port to be housed within a fenced area for additional security and also acts as a wind breaker. Humans can enter inside the fenced area around drone port 702 for repair/maintenance etc. through gate 754 (shown as an opening in FIG. 7B). In some embodiments, other components can be mounted externally on enclosure 756. For example, FIG. 7B shows sounder 750, camera 758, and weather station 752 mounted on enclosure 756. Sounder 750 can emit a tone or beep (e.g., 55-110 dB) warning bystanders of an impending launch or landing. Camera 758 can capture images/video associated with drone 716 when launching or landing. By using internally located camera 708 (in FIG. 7A) and externally located camera 758 (in FIG. 7B), the drone and/or the drone port can be monitored. In some embodiments, at least one or both cameras can have internet connectivity for sending the video/images to a remote server. This can ensure safety of the drone and the drone port from getting lost, vandalized, or stolen. In some embodiments, camera 758 can be Wifi enabled, and equipped with high density (HD) night vision functionality upto a distance of 32 ft. Weather station 752 can record local weather parameters, such as wind speed, humidity, precipitation, temperature, dew point, etc. According to disclosed embodiments, weather parameters at a drone port can be considered in determining whether or not to launch the drone. The disclosed drone port can accommodate any type of drone, and not limited to drones from a specific manufacturer or brand as long as physical size and interface requirements are appropriate.

Figure 8:
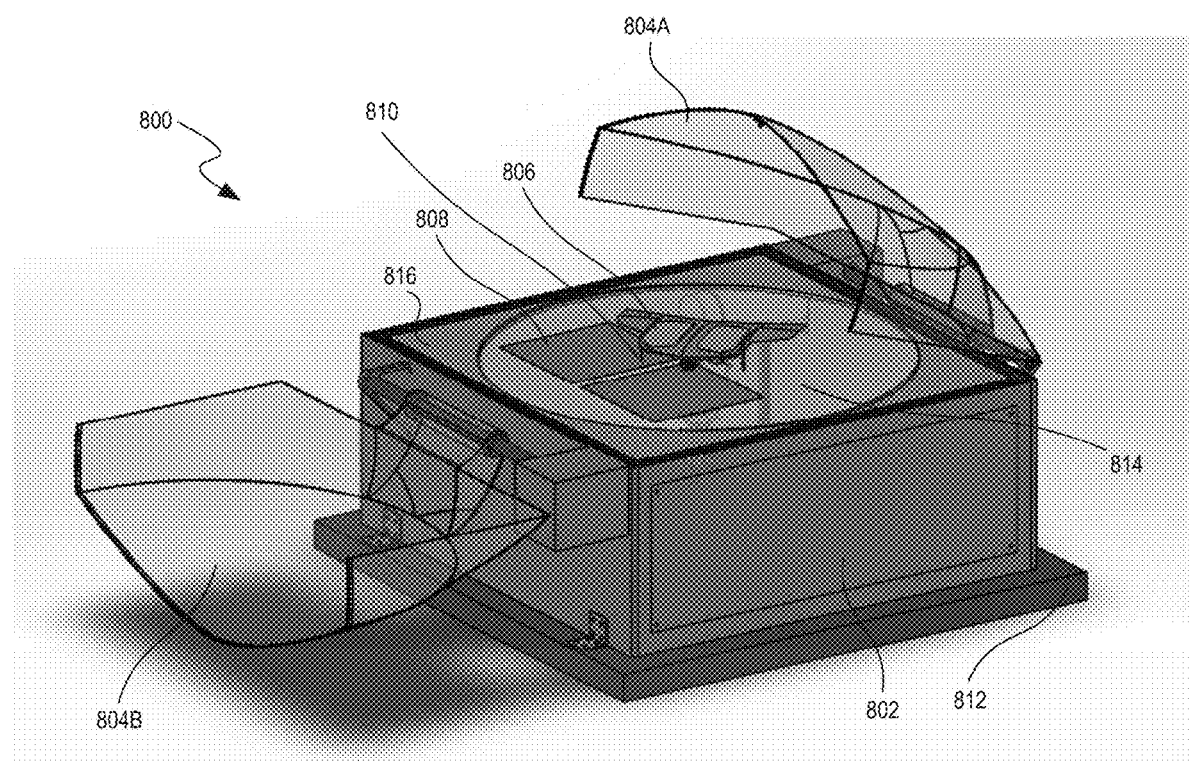
FIG. 8 shows another view of the representative drone port of FIG. 7A.

FIG. 8 illustrates another view of the representative drone port of FIGS. 7A-7B for drone port 800. Drone port 800 is similar to drone port 702 of FIGS. 7A, 7B. FIG. 8 shows drone port 800 with the its upper surface (dome) split in the middle to form port exposure doors 804A, 804B that open according to a clamshell configuration exposing the internal structure of drone port 800. Base 802 of drone port 800 can be made of polycarbonate, aluminum, plastic or other non-ferrous materials to eliminate electromagnetic interference with the compass, or other electrical components of drone 806. Pad 812 (typically made of concrete) supports base 802 of drone port 800. Drone port 800 includes a landing assembly that is automated to adjust itself in a manner such that at least one landing gear leg 810 (preferably, both gear legs) of drone 806 makes contact with charging pad 808 to derive electrical charge from drone port 800. Charging pads 802 are attached to circular landing table 814. Circular landing table 814 provides rotate and tilt functionality. As a result, upon landing, landing assembly can control the movement of circular landing table 814 to orient circular landing table 814 at a suitable angle (and along a suitable axis) to stabilize drone 806, even if drone 806 is tilted at a certain angle when it lands, e.g., under windy landing conditions. Circular landing table 814 is included in an opening within a fixed horizontal platform 816. Although two charging pads 808 are shown in FIG. 8, in alternate embodiments, there can be any number (e.g., four) of charging pads attached to the landing assembly. Further, in alternate embodiments, a drone port can have any number of doors and a corresponding number of hinges for controlling the opening and closing of the door(s). In some embodiments, port exposure doors 804A, 804B are controlled by 2 HP, 1750 rpm AC motors that take a short time (e.g., about 15 seconds) to open port exposure doors 804A, 804B.

Figure 9A:
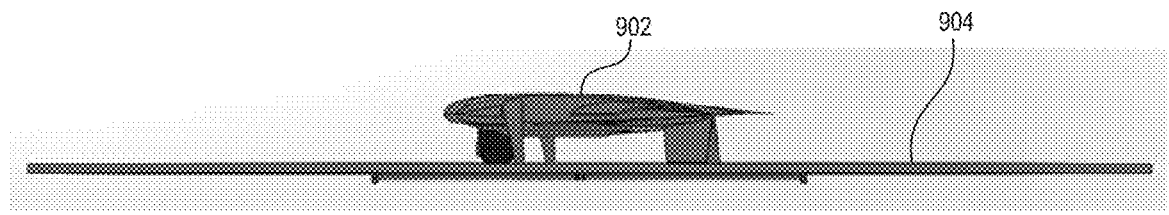
FIGS. 9A-9B show views of a portion of the landing assembly depicting a drone docked to the representative drone port of FIG. 7A.
Figure 9B:
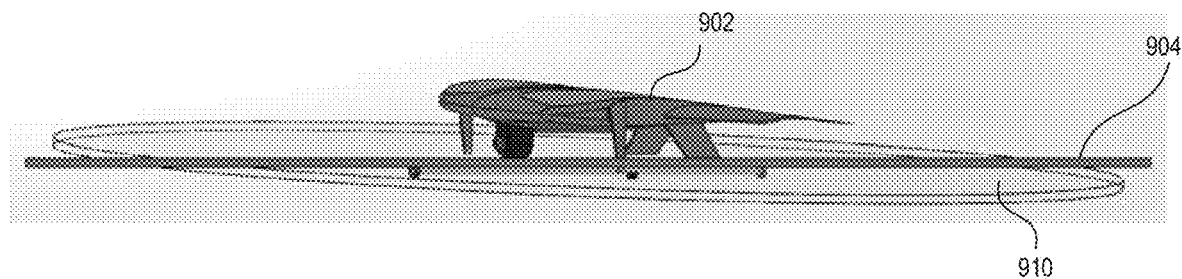

FIGS. 9A-9B show views of a portion of the landing assembly depicting a drone docked to the representative drone port of FIG. 7A. In FIG. 9A, although the circular landing table (e.g., circular landing table 814 of FIG. 8) is not visible, it will be understood that drone 902 actually lands on the circular landing table included inside horizontal platform 904. FIG. 9B provides a better illustration. FIG. 9B shows drone 902 docked on circular landing table 910 tilted with respect to horizontal platform 904. In some embodiments, one or more sensors can be attached to circular landing table 910 to detect angular inclination(s) of circular landing table 910 with respect to XYZ axes. In some embodiments, horizontal platform 952 and/or circular landing table 954 can be illuminated with LED lights.

Figure 9C:
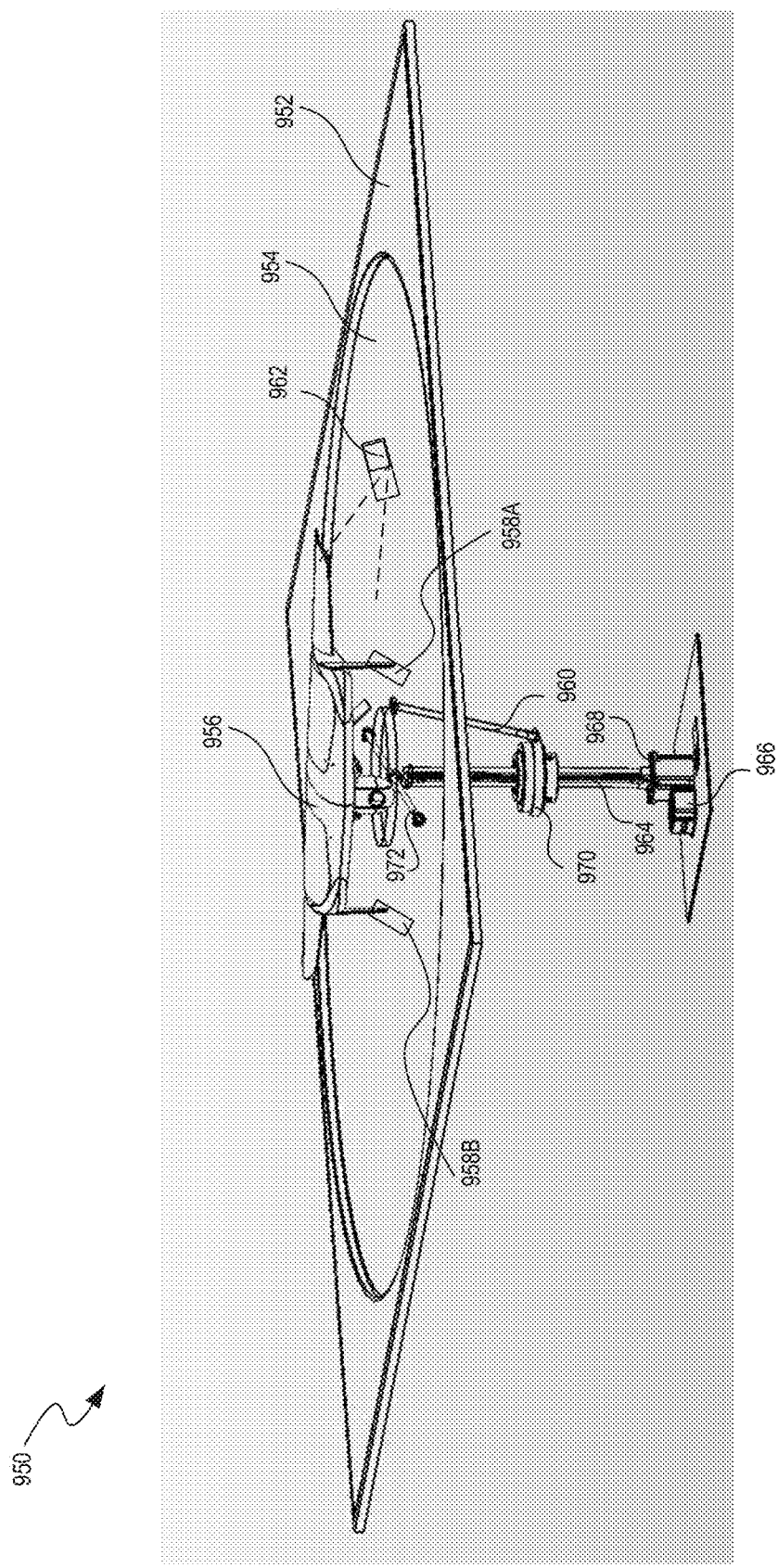
FIG. 9C shows a view of the landing assembly depicting a drone docked to a landing platform of the representative drone port of FIG. 7A.

FIG. 9C shows a landing assembly 950 depicting a drone 956 docked to a circular landing platform of the representative drone port of FIG. 7A. Landing assembly 950 includes horizontal platform 952 with an interior opening for circular landing table 954 which is supported by movement of lead screw 964 moving upward and downward vertically, connecting rod 960, and pivot shaft 972. Drone 956 docks on circular landing table 954 with its landing gear legs making contact with charging pads 958A, 958B. In some embodiments, charging pads 958A, 958B include silver-plated, copper contacts for fast and reliable charging. Stabilizer fins located at the rear of drone 956 also make contact with circular landing table 954. Thus, in some embodiments, there can be four points of contact when drone 956 is docked. Landing assembly 950 is powered by motor 968 which is controlled by motor driver 966. Motor 968 and motor driver 966 are located at the base of assembly 950.

Motor 968 rotates a lead screw 964 which threads into collar 970. As motor 968 rotates lead screw 964, collar 970 raises or lowers, depending on the direction of motor 968. As collar 970 moves, it pivots circular landing table 954 about pivot shaft 972 via connecting rod 960. Pivot shaft 972 is supported on a distal end of lead screw 964 such that rotation of lead screw 964 also rotates circular landing table 954. Accordingly, rotation of motor 968 simultaneously tilts and rotates the landing table 954. Depending on the landing conditions (e.g., wind), the flight path of drone 956, the tilt and rotation angle of circular landing table 954 can be coordinated to the best position so that the drone lands on circular landing table making contact with charging pads 958A, 958B. This procedure can be automated to enable calibration of the GPS/compass units of drone 956. Accordingly, it will be appreciated that circular landing table 954 operated as a "movable turntable" in calibrating GPS/compass units of drone 956, based on the automated movement of landing assembly 950.

In some embodiments, a trigger-sensor is attached to circular landing table 954 to verify that the drone has landed. Also shown in FIG. 9C is IR lock module 962 attached on circular landing table 954. IR lock module 962 works in conjunction with a landing camera on drone 956 for launching and landing as explained below.

In some embodiments, the landing process begins with the drone port receiving a proximity signal from a drone. For example, the drone can send "a close-by" signal at a GPS way-point at a location close to the drone port so that the drone port can prepare for the drone's landing. Upon receiving the proximity signal, the drone port's computer sends an instruction to the motor driver to open the drone port. Upon receiving the instructions, the driver instructs the motors to open the door(s) of the drone port. The drone port computer activates an IR beacon (e.g., by sending a request to IR lock module 962 in FIG. 9C). The landing camera (e.g., landing camera 608) senses the IR beacon from the drone port. To remain "locked" in the path of the IR beacon, the drone's on-board flight controller can make adjustments to the drone's position during landing. The drone lands precisely on the circular landing table, e.g., within a margin of about +/−6 inches from the beacon. The drone's on-board computer sends a "landed on port" signal to the drone port. Upon receiving the "landed on port" signal, the drone port computer deactivates the IR beacon and instructs the motor driver to close the door(s) of the drone port.

Figure 10:
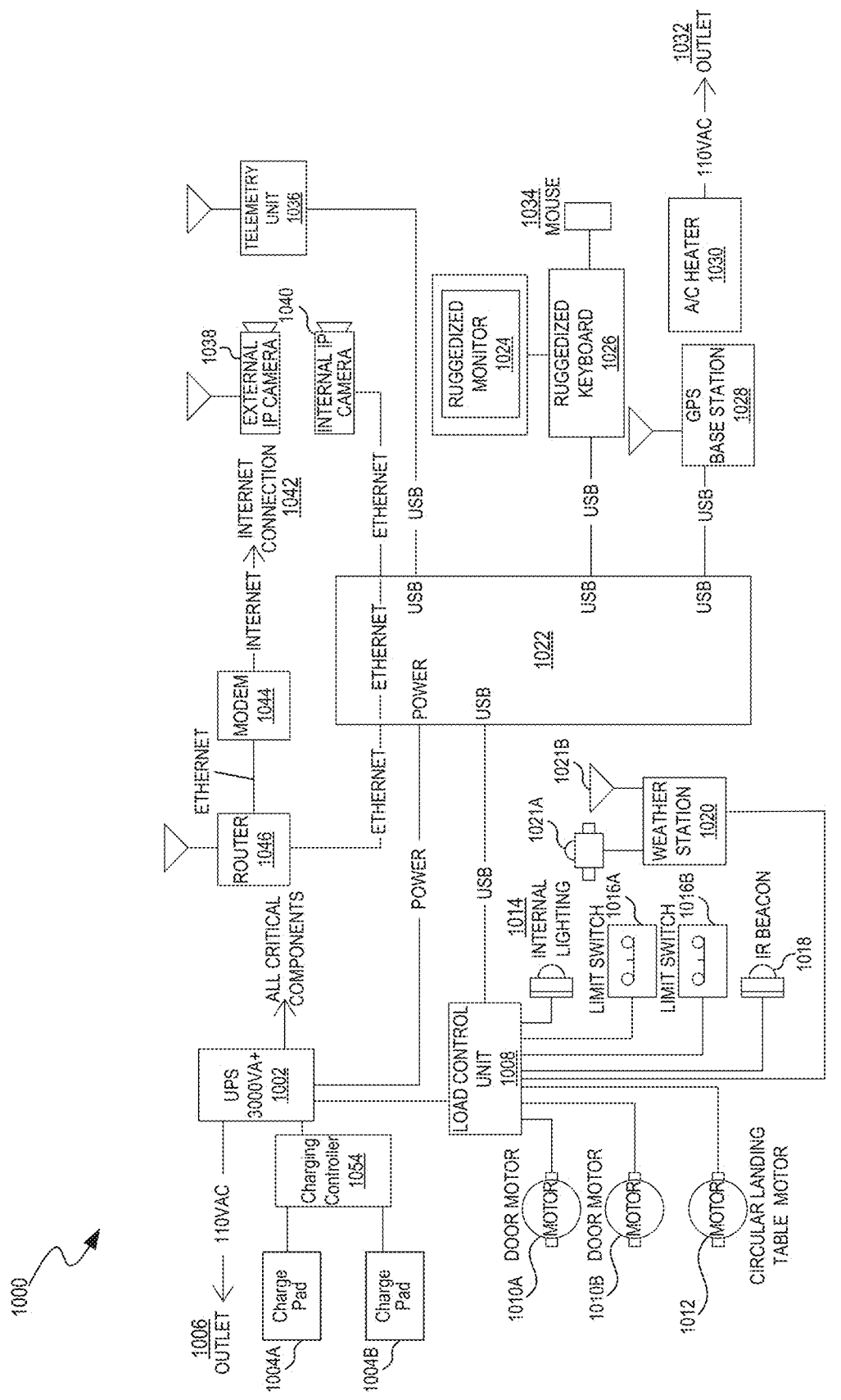
FIG. 10 shows a schematic block diagram of various circuit components of the representative drone port of FIG. 7A.

FIG. 10 shows a schematic block diagram of various circuit components of the representative drone port of FIG. 7A. For example, FIG. 10 illustrates multiple electrical and mechanical components connected to processor 1022. Processor 1022 is powered by uninterrupted power supply (UPS) 1002 which charges from outlet 1006 (e.g., a 110 V AC or 220 V AC supply or a generator). Processor 1022 is connected via USB connections to load control unit 1008, GPS base station 1028, ruggedized keyboard 1026 (connected to ruggedized monitor 1024 and mouse 1034), telemetry unit 1036, and internal IP camera 1040. In some embodiments, processor 1022 does not need require an external fan for cooling purposes. An example of processor 1022 can be a MICROSOFT WINDOWS personal computer. Processor 1022 is configured to run software (e.g., mission planning module 214 in FIG. 2) that controls the operations of the drone port associated with launching/landing of the drone, charging the drone, and calibrating the drone's components.

Processor 1022 controls the operation of multiple electrical and mechanical loads via load control unit 1008, which is connected to processor 1022 by a USB connection. Load control unit 1008 balances the distribution of power to the connected electrical and the mechanical loads. FIG. 10 shows load control unit 1008 connected to door motors 1010A, 1010B, circular landing table motor 1012, IR beacon 1018, limit switches 1016A, 1016B, weather station 1020, and internal lighting 1014 to illuminate the interior of the drone port. Door motors 1010A, 1010B control the opening and closing of the port exposure doors (e.g., port exposure doors 804A, 804B of FIG. 8) of the drone port. In some embodiments, the drone port can have a single door. In those embodiments, a single door motor can suffice. Limit switches 1016A, 1016B constrain the movement of the door(s) of the drone port. They detect when the door(s) of the drone port are open or closed. Weather station 1020 includes a plurality of weather-related sensors 1021A, 1021B (such as a thermometer and an anemometer), which can be configured to communicate wirelessly with router 1046 for sending weather information at the drone port to processor 1022.

Circular landing table motor 1012 controls the movement of circular landing table (e.g., circular landing 904 in FIG. 9B) included in the drone port. IR beacon 1018 is used for precision landing of the drone on the launch pad (e.g., horizontal platform 904 in FIG. 9) included in the drone port. In some embodiments, IR beacon operated in conjunction with the drone's landing camera (e.g., camera 608 in FIG. 6) located on the lower surface of the drone in a downward-facing manner. The joint operation of IR beacon and the drone's camera can result in accurate landing of the drone within a very small margin (e.g., +/−2.5 cm) of error.

Modem 1044 is connected to the Internet via wired Internet connection 1042. Router 1046 communicates with modem 1044 via an Ethernet cable. Router 1046 can be a Wifi router equipped with Ethernet ports. One of the Ethernet ports of router 1046 is connected to processor 1022 via an Ethernet cable. Accordingly, this provides an Internet connection for processor 1022. Internal IP camera 1040 is connected via Ethernet to processor 1022. Internal IP camera 1040 (e.g., similar to camera 708 in FIG. 7A) is attached to a door of the drone port and faces the drone. External IP camera 1038 (e.g., similar to camera 758 in FIG. 7B) is mounted on a fenced boundary enclosing the drone port. In some embodiments, internal IP camera 1040 and external IP camera 1038 both communicate wirelessly with router 1046 which can convey the captured video/images to processor 1022.

Charge pads 1004A, 1004B included in the drone port derive electrical power from UPS 1002, which is used to charge the drone when the drone makes contact with the charge pads. In some embodiments, e.g., as shown in FIG. 10, charging controller 1054 coupled between charge pads 1004A, 1004B and UPS 1002 manages the charging of charge pads 1004A, 1004B from UPS 1002. In some embodiments, operation of UPS 1022 can be remotely managed (e.g., for turning off/on, reset, etc.) via a network by connecting UPS 1022 to a power manager device. An example of a power manager device can be Wattbox. In some embodiments, A/C heater unit 1030 (e.g., HVAC unit 712 in FIG. 7A) is used to maintain the internal temperature of the drone port within a desirable range and derives power from outlet 1032.

GPS base station 1028 receives a GPS signal so that the drone port can identify its geographical location, e.g., latitude/longitude. The geographical location of the drone port can be used in calibrating the GPS and/or compass unit of the drone when the drone is docked. Further, the drone port can send its geographical location to pulse module as one of the criteria for determining whether a drone docked at a drone port can be selected for deployment to the incident location. For example, pulse module can use the drone port's geographical location port to determine the distance between the drone and the incident location. In some embodiments, GPS base station 1028 can be used to enhance the accuracy of the drone's GPS signal through RTK.

Telemetry unit 1036 can communicate telemetry information of the drone port to the external world. In some embodiments, telemetry information from the drone can be communicated to a telemetry unit located on the drone. An example of telemetry unit 1036 can be RFD 900+ Long Range Telemetry manufactured by RF Design Pty Ltd. In some embodiments, a telemetry unit at the drone port may be optional. For example, some drones can utilize the LTE modem for communicating data to a mobile application running on the ANDROID operating system. In some embodiments, a mesh network-based radio can also be used. An example of a mesh network-based radio is one manufactured by Rajant Networks.

The design of the drone port disclosed herein is advantageous in many ways. The drone port can handle extreme outside weather (e.g., dust and moisture) conditions while maintaining an ambient temperature internally. The drone port is configured to receive the drone's health, welfare, and location information in real-time. The drone port provides an IR-based docking mechanism for precision landing of the drone, with a very low margin of error. The drone port allows automatic calibration of the GPS/compass units of the drone. The drone port allows automatic charging of the drone's batteries. The design of the drone port is conducive for easy maintenance of the drone and the drone port. The drone port allows remote monitoring of itself and the drone when taking off, landing, and docked. Also, the disclosed drone port has fast response time (about 15 seconds) for opening and closing its doors for takeoff and landing.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. Also, many of the software modules can be provided as widgets to end users. For example, the candidate rankings tool and the system-wide summary of responsiveness to several emergency situations by different mobile emergency units in real-time or near real-time can be provided as widgets. The connectivity between the modules and/or components within the modules may be provided using any one of the connectivity methods and media that is known in the art, including, but not limited to, communications over the Internet, wired, or wireless networks using the appropriate protocols.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated. The features of the embodiments described herein may be combined in all possible combinations of methods, apparatus, modules, systems, and computer program products.

The invention claimed is:

1. A system comprising:
at least one server computer configured to:
track in real-time multiple resources associated with a fleet of geographically distributed unmanned aerial vehicles (UAVs);
receive information pertaining to an emergency situation from a computer aided dispatch (CAD) system;
determine priorities associated with the fleet of UAVs based on the multiple resources and the information from the CAD system;
deploy at least one UAV to a location of the emergency situation based on the priorities and a set of parameters; and
upon request from a user, replay information indicative of attributes associated with deployment of at least one emergency response vehicle and the at least one UAV;
the at least one server computer being in communication with a plurality of UAVs and a plurality of CAD systems, the at least one server computer including a plurality of modules and a mapping application integrated with the plurality of modules, the plurality of modules including:
at least a first module to evaluate, monitor, and track a plurality of incident calls, including incident calls pertaining to emergency situations, processed by the plurality of CAD systems and any response units sent out by the CAD systems in response to the incident calls;
at least a second module to evaluate performance of the plurality of CAD systems or any response unit sent out in response to the incident calls;
at least a third module to make an incident-related decision about the incident calls by:
(i) tracking real-time information pertaining to each UAV, the real-time information including: first information corresponding to a location of the UAV, second information corresponding to whether the UAV is docked or in-flight, and third information corresponding to the UAV's battery-life;
(ii) determining launch, landing and in-flight operations of the plurality of UAVs; and
(iii) selecting one or more UAVs in the plurality of UAVs to deploy in response to a selected incident call; and
at least a fourth module to offer corrective/remedial action in connection with a selected incident call by:
(i) selecting an incident call from the plurality of incident calls to identify a prioritized incident call; and
(ii) determining information indicative of attributes associated with deployment of one or more units or UAVs in response to the prioritized incident call, including determining whether the deployment of the one or more units or UAVs was timely.

2. The system according to claim 1, wherein said system further comprises said at least one UAV in the plurality of UAVs, said at least one UAV adapted for wireless communication with the at least one server computer and configured to:
take off and land vertically at a home base and optionally at the location of an emergency situation;
fly horizontally to and from the location of the emergency situation;
relay information corresponding to an environment associated with the emergency situation, wherein the information includes operational parameters of the at least one UAV; and
based on feedback from the at least one server computer, take remedial action in connection with the emergency situation.

3. The system according to claim 1, wherein the real-time information pertaining to each UAV includes a determination of internal heat produced, amount of memory available, amount of processing power consumed, strength of RF signal received, speed and direction of surrounding wind, surrounding temperature; GPS connectivity; communication network connectivity, and an indication of any mechanical or electrical failure.

4. The system according to claim 1, wherein the plurality of modules makes a determination of at least one of:
timeliness of deployed UAVs or units sent in response to the plurality of incident calls;
whether routes taken by a deployed UAVs were optimal; or
whether routes taken by deployed units were optimal.

5. The system according to claim 1, wherein the plurality of modules determines whether an in flight UAV is to continue to the location of the prioritized incident call, reroute to another location of another call, or return to a home base.

6. The system according to claim 5, wherein the plurality of modules controls the in flight UAV to return to the home base and selects another docked UAV for deployment to the location of the prioritized incident call.

7. The system according to claim 6, wherein the plurality of modules, based on information of a first in flight UAV deployed to the location of the prioritized incident call and information of a second in flight UAV deployed to another location of another call, selects the first in flight UAV to return to a home base and reroute the second in flight UAV to the location of the prioritized incident call.

8. The system according to claim 1, wherein the plurality of modules controls access privilege to control-operations of one or more UAVs in the plurality of UAVs.

9. The system according to claim 8, wherein the plurality of modules controls accesses to a UAV in the plurality of UAVs between a first responder in a first geographical region and a second responder in a second geographical region different than the first geographical region.

10. The system according to claim 1, wherein the at least one server computer is networked with a plurality of Public Safety Access Points (PSAPs) each having a user interface such that the PSAPs can control the plurality of modules via the user interfaces.

11. A system to make incident related decisions for unmanned aerial vehicles (UAVs), the system comprising:
a server computer configured to:
track in real-time multiple resources associated with a fleet of geographically distributed UAVs;
receive information pertaining to an emergency situation from a computer aided dispatch (CAD) system;
determine priorities associated with the fleet of UAVs based on the multiple resources and the information from the CAD system;
deploy at least one UAV to a location of the emergency situation based on the priorities and a set of parameters; and
upon request from a user, replay information indicative of attributes associated with deployment of at least one emergency response vehicle and the at least one UAV; and
a module of the server computer integrated with a mapping application and a plurality of databases including:
a first databases of real-time to near real time telematic UAV information from each UAV in the fleet of UAVs, the fleet including docked and in flight UAVs, the UAV information including health and welfare information, operational parameters and sensor data; and
at least a second database of real-time incident call information, the module defining multiple criteria to select UAVs for any one of launching, landing or routing each UAV in the fleet of UAVs.

12. The system according to claim 11, wherein the server computer is in communication with any one of a plurality of CAD systems or a plurality of Public Safety Access Points (PSAPs) to integrate the module with the at least second database.

13. The system according to claim 11, wherein the server computer is in communication with a UAV port to integrate the module with the first database.

14. The system according to claim 11, wherein the module is integrated with a remote cloud-based engine defining a mission planning module to receive health and welfare information and operational parameters of one or more UAVs.

15. The system according to claim 14, wherein the remote cloud-based engine is connected to a fight path information database, an object avoidance/no fly database and weather information database.

16. The system according to claim 14, wherein the module and remote cloud-based engine define a geofence to restrict a UAV within a geographical area.

17. The system according to claim 11, wherein the module defines a set of priorities to determine which of the UAVs to deploy to an incident location.

18. The system according to claim 11, wherein the server computer is connected with a security module for encrypted communication with one or more of a UAV, a drone port, a remote-based engine defining a mission planning module or an external database.

19. The system according to claim 11, wherein the module and mapping application display the location of at least one UAV in the fleet of UAVs.

20. A method of making incident related decisions for unmanned aerial vehicles (UAVs), the method comprising:
tracking in real-time multiple resources associated with a fleet of geographically distributed UAVs;
receiving information pertaining to an emergency situation from any one of a plurality of computer aided dispatch (CAD) systems;
determining priorities associated with the fleet of UAVs based on the multiple resources and the information from the one CAD system;
deploying at least one UAV to a location of the emergency situation based on the priorities and a set of parameters, the parameters including criteria associated with real-time to near real-time information of the fleet of UAVs, the fleet including docked and in flight UAVs, and the details of the information from the one CAD system; and
replaying information indicative of attributes associated with deployment of at least one emergency response vehicle and the at least one UAV.

21. The method according to claim 20, wherein the receiving includes evaluating, monitoring, and tracking a plurality of incident calls from the plurality of CAD systems.

22. The method according to claim 21, wherein the evaluating includes evaluating performance of the one or more of the plurality of CADs processing each incident call and evaluating response units sent out in response to the incident calls.

23. The method according to claim 20, wherein the deploying includes selecting launch, landing, or in-flight of operation of each of the plurality of UAVs.

24. The method according to claim 20, wherein the tracking in real-time includes tracking location information, including whether the UAV is docked or in-flight; and battery-life.

25. The method according to claim 20, wherein the tracking in real-time includes tracking internal heat produced; amount of memory available; amount of processing power consumed; strength of RF signal received; speed and direction of surrounding wind; surrounding temperature; GPS connectivity; communication network connectivity; and indication of any mechanical or electrical failure.

26. The method according to claim 25, further comprising offering corrective/remedial action in connection with an emergency situation that that includes analyzing activity in a response zone associated with the emergency situation during a time of the emergency situation including analyzing response of emergency vehicles and UAVs selected to deploy in emergency situation.

\* \* \* \* \*